US012470922B2

(12) United States Patent
Bencheikh et al.

(10) Patent No.: US 12,470,922 B2
(45) Date of Patent: Nov. 11, 2025

(54) AUTHENTICATION AND DATA FLOW CONTROL CONFIGURATION

(71) Applicant: Charter Communications Operating, LLC, St. Louis, MO (US)

(72) Inventors: Ahmed Bencheikh, Lorton, VA (US); Christopher J. Teague, Highlands Ranch, CO (US); Venkata R. Divvi, Centennial, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 836 days.

(21) Appl. No.: 17/666,862

(22) Filed: Feb. 8, 2022

(65) Prior Publication Data

US 2023/0254691 A1  Aug. 10, 2023

(51) Int. Cl.
*H04W 12/06* (2021.01)
*H04W 12/082* (2021.01)
*H04W 12/69* (2021.01)
*H04W 28/12* (2009.01)

(52) U.S. Cl.
CPC ......... *H04W 12/06* (2013.01); *H04W 12/082* (2021.01); *H04W 12/69* (2021.01); *H04W 28/12* (2013.01)

(58) Field of Classification Search
CPC ... H04W 12/06; H04W 12/082; H04W 12/69; H04W 28/12
See application file for complete search history.

(56) References Cited

U.S. PATENT DOCUMENTS

| | | | | |
|---|---|---|---|---|
| 6,795,443 | B1* | 9/2004 | Jeong | H04L 12/66 370/395.5 |
| 2004/0165603 | A1* | 8/2004 | D'Angelo | H04L 69/08 370/395.54 |
| 2009/0198996 | A1* | 8/2009 | Lie | H04L 63/08 713/155 |
| 2010/0191813 | A1* | 7/2010 | Gandhewar | H04L 61/5014 709/206 |
| 2014/0341109 | A1* | 11/2014 | Cartmell | H04L 43/50 370/328 |

(Continued)

OTHER PUBLICATIONS

Inoue et al., "MIRAI: A Solution to Seamless Access in Heterogeneous Wireless Networks", May 2003, IEEE International Conference on Communications, vol. 2, pp. 1033-1037 (Year: 2003).*

*Primary Examiner* — Kenneth W Chang
(74) *Attorney, Agent, or Firm* — Armis IP Law, LLC

(57) ABSTRACT

A wireless access point receives a request from a communication device for wireless access to a remote network. An authentication resource authenticates the communication device to use a wireless network provided by the wireless access point. Prior to providing notification to the communication device that it has been authenticated, a communication management resource produces data flow control settings and applies the data flow control settings to a communication gateway. Thereafter, the communication device is notified that it has been authenticated via the authentication resource. The communication gateway then controls flow of data through a communication gateway to the remote network via implementation of the data flow control settings.

30 Claims, 18 Drawing Sheets

(56) References Cited

U.S. PATENT DOCUMENTS

| | | | |
|---|---|---|---|
| 2015/0215784 A1* | 7/2015 | Gunasekara | H04L 63/102 |
| | | | 455/411 |
| 2015/0271102 A1* | 9/2015 | Antich | H04L 47/805 |
| | | | 370/230 |
| 2016/0157094 A1* | 6/2016 | Skog | H04L 45/72 |
| | | | 370/328 |
| 2017/0063934 A1* | 3/2017 | Manroa | H04L 63/105 |
| 2018/0324138 A1* | 11/2018 | Das | H04L 61/5053 |
| 2020/0045554 A1* | 2/2020 | Zhang | H04W 16/02 |
| 2020/0229071 A1* | 7/2020 | Ansley | H04W 12/75 |

\* cited by examiner

AUTHENTICATION AND DATA FLOW CONTROL CONFIGURATION

BACKGROUND

Conventional out of band message-based solutions are implemented post authentication phase. For example, according to conventional techniques, a new or existing mobile communication device may be authenticated to use a respective network. After notifying the communication device that it has been authenticated and completion of authentication, a wireless network implements respective processing to support communications associated with the authenticated communication device.

BRIEF DESCRIPTION OF EMBODIMENTS

Embodiments herein provide novel ways of providing improved wireless communications to one or more mobile communication devices in a network environment. For example, a communication as discussed herein provisions dynamic service policy rules during initial authentication or subsequent instances of authentication of a mobile communication device based on an authentication method selected by the device. If desired, the techniques as discussed herein may be implemented to differentiate "mobile services subscribers" irrespective of their location (either at home or outdoor using a service provider's other coverage). If desired, embodiments herein may also provide a more elevated level of wireless service in terms of throughput, prioritization, and user experience to newly authenticated communication devices compared to a level of wireless service provided to other devices in communication with a remote network through a shared wireless access point.

More specifically, in example embodiments, a wireless access point receives a request from a communication device for wireless access to a remote network. An authentication resource authenticates the communication device to use wireless services provided by the wireless access point. Prior to providing notification to the communication device that it has been authenticated and/or allowing the mobile communication device to use wireless services of the wireless access point, a communication management resource produces data flow control settings and applies those data flow control settings to one or more communication gateway resources in a backhaul of a network. Subsequent to setup of a data flow control settings, the communication device is notified that it has been authenticated via the authentication resource and it is able to use wireless network services. The communication gateway then controls flow of data through a communication gateway to the remote network via implementation of the data flow control settings.

In further example embodiments, during the authentication, the communication management resource reserves use of a network address for the communication device. Subsequent to the authentication, the communication management resource assigns the communication device use of the previously reserved network address. In one embodiment, the wireless access point communicates the reserved wireless network address to the communication device over a wireless link. Subsequent to completing authentication, controlling the flow of data through the communication gateway includes: i) receiving data packets originating from the communication device; and ii) in response to detecting presence of the network address in each of the data packets, providing a level of service of forwarding the data packets through the backhaul network to the remote network in accordance with the data flow control settings.

In still further example embodiments, during the authentication, the communication management resource: receives a unique identifier value assigned to the communication device; reserves a network address for later use by the communication device; and derives the data flow control settings based at least in part on the unique identifier value. In further example embodiments, the communication management resource produces a mapping or correlation between the network address and the data flow control settings. In one embodiment, the communication gateway includes a cable modem disposed in a respective subscriber domain.

In accordance with further embodiments, authentication of the communication device includes: authenticating the communication device via conveyance of communications from the wireless access point through the communication gateway to the authentication management resource.

Subsequent to authentication, the communication management resource (such as via backhaul communication gateways) as discussed herein monitors the flow of data between the communication device and the remote network. In one embodiment, the communication management resource terminates use of the data flow control settings and the network address assigned to the communication device in response to detecting that the flow of data falls below a threshold level for a time duration.

In still further example embodiments, the communication management resource configures the communication gateway with the data flow control settings prior to an authentication server providing notification of successful authentication of the communication device. In one embodiment, the communication management resource configures the communication gateway with the data flow control settings prior to providing notification to the communication device that the communication device has been authenticated by an authentication server.

Yet further embodiments herein include, via the communication management resource, detecting an identity of the communication device during the authentication; determining a quality of service to provide to the communication device based on the determined identity of the communication device or corresponding user; and producing the data flow control settings to provide the determined quality of service.

Controlling the flow of data through the communication gateway includes implementing a quality of service as specified by the data flow control settings via a communication pathway including a wireless access point, a first terminal (such as a cable modem, Optical Network Unit, etc.), and a second terminal (such as cable modem termination system, Optical Line Terminal, etc.); and via the wireless access point, providing wireless connectivity to the communication device.

In still further example embodiments, the wireless base station or other suitable entity receives a unique identifier value assigned to the mobile communication device prior to authentication of the mobile communication device to use the wireless network. For example, the mobile communication device can be configured to insert the device UUID (i.e., unique identifier value provisioned by service provider or device Identifier) during the association with the network via message flow prior to authentication.

In yet further example embodiments, during authentication of the mobile communication device to use the wireless network, the wireless base station or other suitable entity communicates with the mobile communication device to retrieve a unique identifier value assigned to the mobile communication device. Thus, the wireless base station can be configured to communicate (such as using protected action frames or other communications) with the mobile communication device for its UUID (i.e., unique identifier value such as universally unique identifier, which may be a 128-bit label used for information in computer systems) during authentication.

In one embodiment, the mobile communication device solicits details of a respective unique identifier value via protected action frames. Thus, as an alternative embodiment, the communication device may solicit the UUID details using protected action frames.

As previously discussed, conventional techniques include customer devices connecting to an In-Home private Wi-Fi™ solution. It is desirable to provide such mobile communication devices a more elevated level of service in terms of throughput, prioritization, and user experience compared to other devices provided connectivity through a respective wireless access point. In contrast to conventional out of band message-based solutions based on post-authentication phase implementation of configuration settings and user-space applications-based solutions, (such as those closely tied to centralized policy engines), embodiments herein include provisioning of proper dynamic service policy rules during a respective authentication phase (process) of authenticating the device.

Note that any of the resources as discussed herein can include one or more computerized devices, mobile communication devices, servers, base stations, wireless communication equipment, communication management systems, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to facilitate wireless connectivity. The instructions, when executed by computer processor hardware, cause the computer processor hardware (such as one or more co-located or disparately processor devices) to: receive a request from a communication device for wireless access to a remote network; authenticate the communication device to use a wireless network; during the authentication of the communication device, applying/supplying (i.e., activating) data flow control settings to a communication gateway; subsequent to authentication of and notification of same to the communication device, control flow of data through the communication gateway to the remote network via implementation of the data flow control settings.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of supporting different wireless services. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

Figure 1:
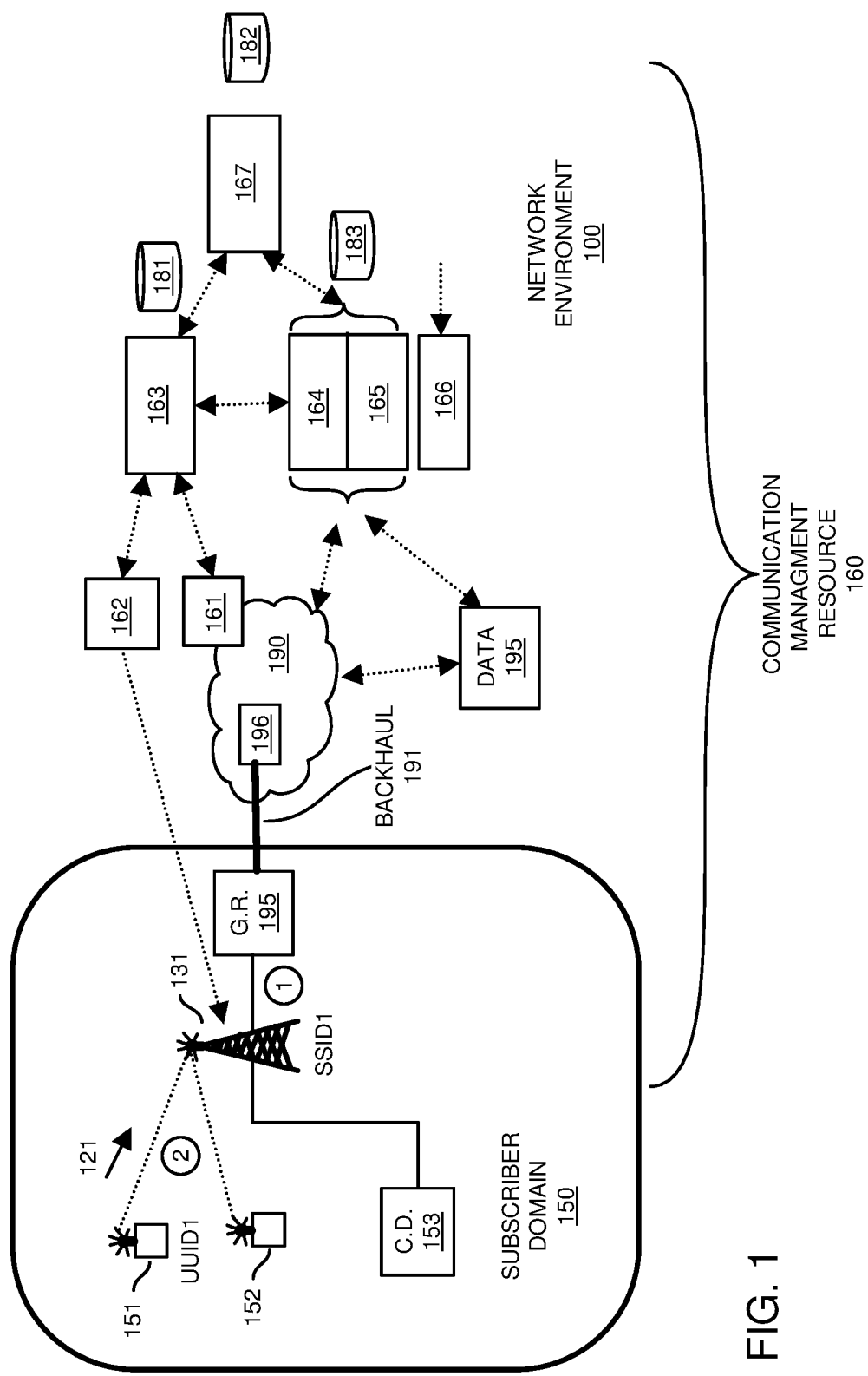
FIG. 1 is an example diagram illustrating backhaul discovery and association of a mobile communication device with a wireless access point according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

A wireless access point receives a request from a communication device for wireless access to a remote network. An authentication resource authenticates the communication device to use a wireless network provided by the wireless access point. Prior to providing notification to the communication device that it has been authenticated, or allowing the mobile communication device to use wireless services, a communication management resource produces data flow control settings and applies the data flow control settings to a communication gateway to support communications to/from the mobile communication device. Thereafter, upon completing authentication and configuration of the communication gateway with the data flow control settings, the communication device is notified that it is able to access a respective remote network through the wireless access point. The mobile communication device transmits data packets through the wireless access point over the configured grant (backhaul). The communication gateway then controls flow of data through a communication gateway to the remote network via implementation of the data flow control settings.

The following sections describe solutions mainly for two kinds of In-Home private networks: Wi-Fi™ wireless & wired Private area Networks. Wi-Fi™ based wireless networks implements various data link layer (aka Layer 2) authentication methods, like 802.1X/EAP methods, WPA2-PSK and WPA3-SAE are a few prominently used methods. With client privacy mechanisms in place for wireless client devices, differentiating devices for various service subscriptions with layer 2 authentication methods may require additional parameter to properly differentiate a new mobile communication device from other devices already on the network.

The two message flows (e.g., a first flow control and management described in FIGS. 1-8 and corresponding text; a second flow control management described in the FIGS. 9-16) are similar to some extent, but include differences in service logic to identify the identity of the device requesting service and corresponding policies.

As a more specific example, in FIGS. 1-8 (first control flow) and corresponding text, the unique identifier value associated with a communication device is retrieved by the wireless access point via action frames, such as during association state of connecting the communication device to the access point. Note that another way of indicating device identity is the communicate device fetching unique identity from profile provisioned by its service providers and inserting the details using extension fields during association with the wireless network. In FIGS. 9-16 and corresponding text, the operations are similar to the first control flow except there is no device unique identifier value retrieval procedure implemented by the wireless base station. Instead, the authentication management resource (such as AAA) captures the authentication method used by device and communicates the information to a Converged Policy Engine.

Now, more specifically, FIG. 1 is an example diagram illustrating backhaul discovery and association of a mobile communication device with a wireless access point according to embodiments herein.

As shown, in this example embodiment, network environment 100 includes subscriber domain 150 and communication management resource 160 (such as communication management system) comprising multiple interconnected management components such as backhaul management resource 161 (such as a backhaul policy engine), policy management resource 162 (such as an access network policy engine), service management resource 163 (such as a so-called converged service engine), authentication management resource 164 (such as a AAA authentication server), account management resource 165 such as a AAA accounting management resource), cable modem server 166, and record management resource 167 (such as a back-office OSS/BSS). In telecommunications, note that OSS/BSS refers to operations support system and business support system that maintain network operations and the business operations around which that network is built.

Subscriber domain 150 (such as a home or business network environment) includes wireless base station 131 providing communication devices such as mobile communication device 151, mobile communication device 152, communication device 153, etc., access to the remote network 190 (such as Internet, cellular network, etc.) via communications through wireless access point 131 and gateway resource 195.

Note that any of the resources as discussed herein can be implemented as hardware, executable software, or a combination of hardware and executable software. For example, each of the communication devices (such as communication device 151, communication device 152, communication device 153, etc.) can be implemented as communication device hardware, communication device software, or a combination of communication device hardware and communication device software; communication management resource 160 can be implemented as communication management hardware, communication management software, or a combination of communication management hardware and communication management software; the backhaul management resource 161 can be implemented as backhaul management hardware, backhaul management software, or a combination of backhaul management hardware and backhaul management software; data flow policy management resource 162 can be implemented as policy management hardware, policy management software, or a combination of policy management hardware and policy management software; service management resource 163 can be implemented as service management hardware, service management software, or a combination of service management hardware and service management software; authentication management resource 164 can be implemented as authentication management hardware, authentication management software, or a combination of authentication management hardware and authentication management software; account management resource 165 can be implemented as account management hardware, account management software, or a combination of account management hardware and account management software; cable modem server 166 can be implemented as cable modem server hardware, cable modem server software, or a combination of cable modem server hardware and cable modem server software; record management resource 167 can be implemented as record management hardware, record management software, or a combination of record management hardware and record management software; wireless base station 131 can be implemented as wireless base station hardware, wireless base station software, or a combination of wireless base station hardware and wireless base station software; gateway resource 195 can be implemented as gateway hardware, gateway software, or combination of gateway hardware and gateway software; gateway resource 196 can be implemented as gateway hardware, gateway software, or combination of gateway hardware and gateway software; etc.

Assume in this example embodiment that the communication device 151 has not yet or never has been authenticated to use wireless services provided by the wireless base station 131 disposed in the subscriber domain 150. As further discussed herein, the communication management resource 160 (such as including one or more components such as wireless base station 131, gateway resource 195, gateway resource 196, backhaul management resource 161, policy management resource 162, service management resource 163, authentication management resource 164, account management resource 165, cable modem server 166, record management resource 167, etc.) provides unconventional techniques of dynamically generating and implementing a data flow control access policy (such as generated during the authentication process) of providing access to a respective user of a communication device.

More specifically, as further discussed herein, in one embodiment, by or prior to completion of the authentication of the communication device 151, the policy is already in place (such as one or more gateway resources configured) to provide the communication device connectivity to a remote network 190 through one or more of the wireless base station 131, gateway resource 195, gateway resource 196, etc.

As a more specific example, in operation #1, the wireless base station 131 discovers backhaul entity resources associated with backhaul 191 (e.g., cable modem CM, optical network ONU, gateway resource 195, gateway resource 196, etc.) including information associated with the backhaul entities. For example, the wireless base station 131 receives information such as transport details (a network address or MAC address assigned to the gateway resource 195, 196, such as respective IPv4 and IPv6 addresses), source port range (MAP-T False cases), etc. This information associated with the one or more backhaul resources is used in a later phase of call flow for upstream to build appropriate Dynamic Service flow rules (such as data flow control settings).

In further example embodiments, the wireless access point 131 broadcasts an available network name such as SSID1 in the subscriber domain 150. In such an instance, via wireless broadcast communications from the wireless access point 131, each of the communication devices in the subscriber domain 150 is made aware of the availability of the wireless access point 131 and wireless network SSID1.

Additionally, in operation #2, assume that the mobile communication device 151 detects a private and/or public in home Wi-Fi networks (such as network as identified by network name SSID1) disposed in subscriber domain 150 via the broadcast of SSID1. The communication device 151 attempts to associate with the known network such as SSID1 (or) a user of the mobile communication device 151 may select a network in which to associate itself.

To establish a wireless communication link and access network 190, in one embodiment, the communication device 151 wirelessly transmits communications 121 such as including a respective request to establish wireless connectivity with the wireless base station 131.

Thus, the wireless access point 131 receives a request from communication device 151 for wireless access to a remote network 190.

Figure 2:
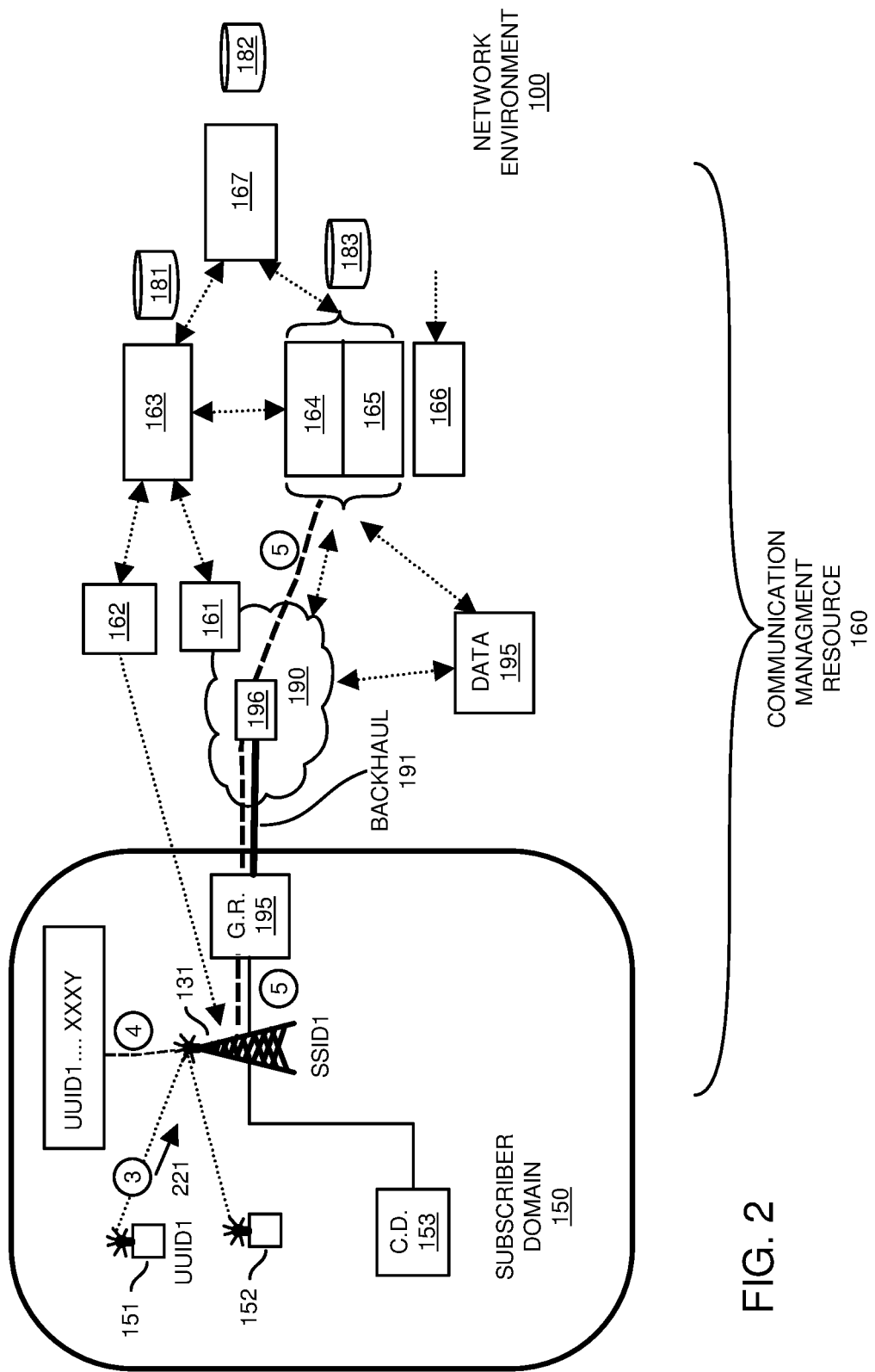
FIG. 2 is an example diagram illustrating determination of device identity, reservation of a network address, and communication of an authentication request from a wireless access point according to embodiments herein.

FIG. 2 is an example diagram illustrating determination of device identity, reservation of a network address, and communication of an authentication request from a wireless access point according to embodiments herein.

In operation #3, such as during association or initial communications, via communications 221 from the mobile communication device 151 to the wireless access point 131, the wireless access point 131 receives or acquires a unique identifier value (a.k.a., device UUID assigned to the mobile communication device 151) using one of the techniques such as: For vendor specific protected action frames, it can be Network Query based [OR] Device Solicitation:

Network query based: to obtain a respective unique identifier value assigned to the mobile communication device 151, the wireless access point 131 communicates a query to the mobile communication device 151 upon receipt of the respective request from the mobile communication device 151 to associate with the wireless access point 131. In response to the query for the mobile communication device's unique identifier value from the wireless base station 131 to the mobile communication device 151, the mobile communication device 151 communicates its unique identifier value UUID or device unique identifier (aka UUID: Universal Unique IDentifier) to the wireless access point 131.

Device Solicitation based: the mobile communication device 151 communicates the unique identifier value (a.k.a., UUID) in a communication such as a vendor Specific Action frame from the mobile communication device 151 to the wireless access point 131.

Further embodiments herein include vendor extension communications with encapsulated UUID1 communicated from the mobile communication device 151 to the wireless access point 131.

In processing operation #4, in response to receiving the unique identifier value (UUID1) of the communication device 151, the wireless access point 131 determines a type of authentication method to be used by the mobile configuration device 151 to authenticate itself for use of the backhaul 191 and access to remote network 190. In one embodiment, in processing operation #4, the wireless access point 131 or other suitable entity reserves a respective network address XXXY (any suitable network address such as an IPV4 and/or IPv6 address, etc.) for use by the mobile communication device 151 and later time. In one embodiment, the network address XXXY reserved for use is obtained from a respective pool of available network addresses.

In processing operation #5, the wireless access point 131 acts as NAS/RADIUS (Network Access Server/Remote Authentication Dial in Service) client, and sends an authentication request (such as RADIUS Access Request) with required AVP's (such as Attribute Value Pairs) and VSA's (Vendor specific attributes) over the communication path from the wireless base station 131 through the gateway resource 195, backhaul 191, gateway resource 196, to the authentication management resource 164 such as to provide notification of the authentication method to be used by the authentication management resource 164 to authenticate the mobile communication device 151.

Additionally, in one embodiment, the wireless access point 131 in operation #5 communicates information such as the unique identifier value (UUID1) assigned to the mobile communication device 151, recently reserved IP address (such as value XXXY), details for device and Back-haul element IP address details to AAA server, etc. In one embodiment, the back-haul edge element such as gateway resource 195 (e.g., Cable Modem, Optical Network Terminal, etc.) may act as RADIUS proxy (or) snooping the RADIUS packets from the wireless access point 131 and build the device session context for managing the dynamic service flow rules received in RADIUS (or) on API from Network.

Figure 3:
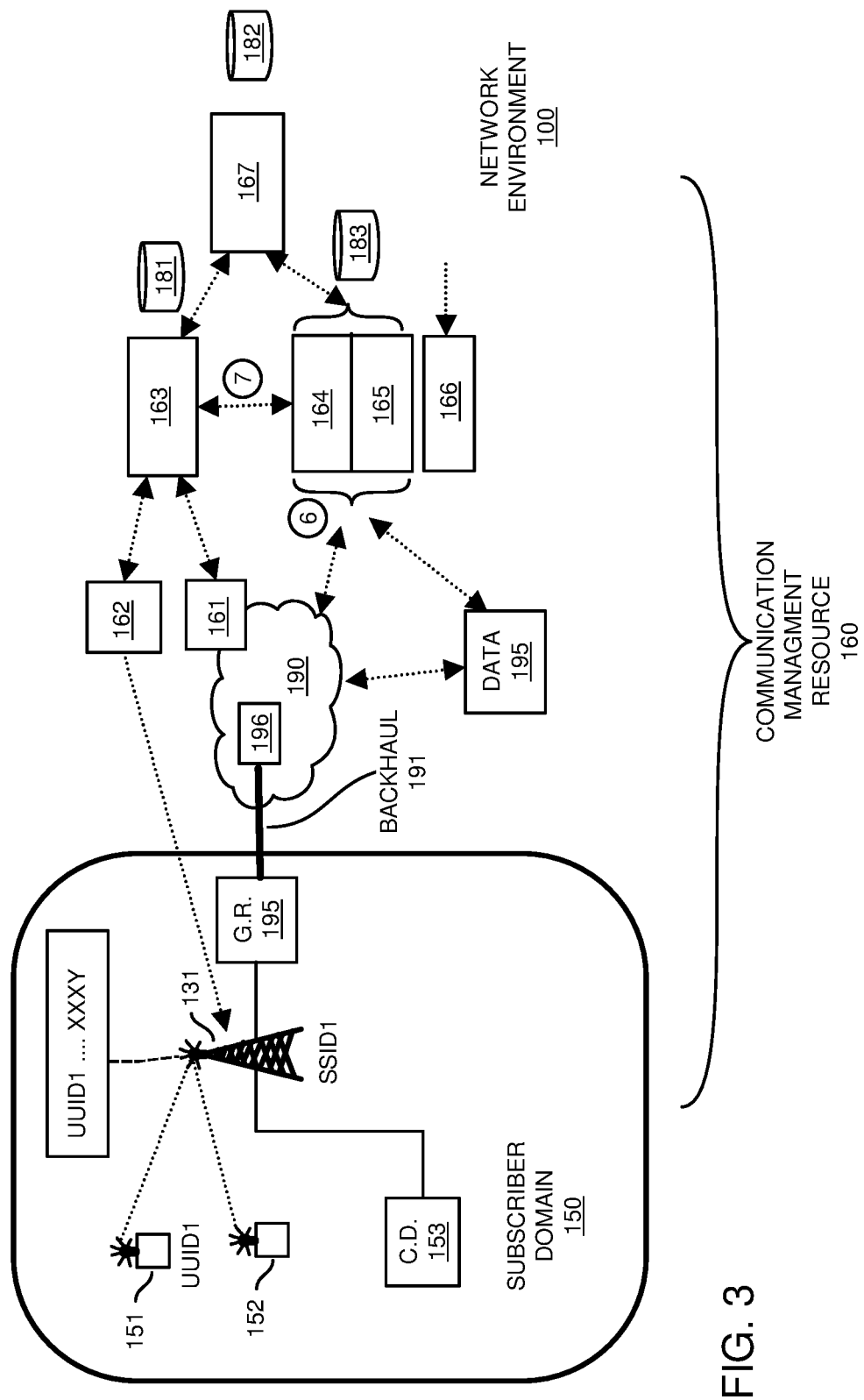
FIG. 3 is an example diagram illustrating device authentication and communication of mobile communication device information to a policy engine for implementation/generation of a policy according to embodiments herein.

FIG. 3 is an example diagram illustrating device authentication and communication of mobile communication device information to a policy engine for implementation/generation of a policy according to embodiments herein.

In operation #6, the authentication management resource 164 (such as AAA server) performs the authentication of the mobile communication device 151 and may persist the authentication method used in local context such as a type of authentication specified by the mobile communication device, wireless access point, etc. Authentication may include the mobile communication device 151 communicating information such as password, username, etc., to the authentication management resource 164 as required by the authentication management resource 164 and corresponding authentication method implemented by it to authenticate the mobile communication device 151.

In operation #7, during authentication of the mobile communication device 151, the authentication management resource 164 notifies (such as via a signal device Connecting/join notification) to the network access service management resource 163 (such as Converged Service Engine). The notification may include information such as a specific authentication method used to authenticate the mobile communication device 151, the device UUID1 assigned to the mobile communication device 151, data traffic flow template information, information about the backhaul 191 and corresponding gateway resources (such as their identities and/or network addresses) to classify the requesting communication device 151 and to retrieve or create the appropriate policy in which to apply to data flow (communication of data packets) associated with the communication device 151 communicating through the gateway resources and corresponding backhaul 191.

Figure 4:
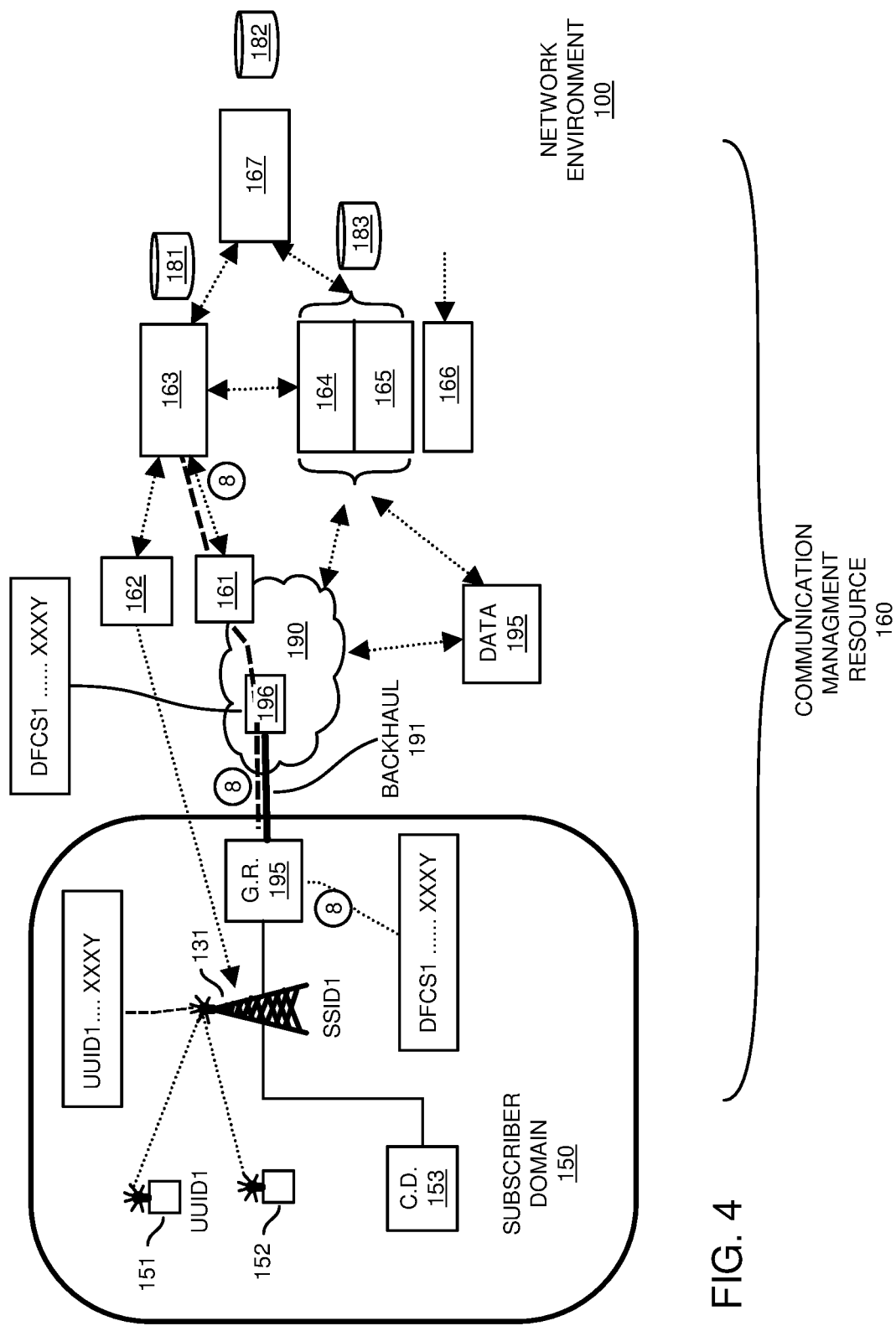
FIG. 4 is an example diagram illustrating generation and distribution of a data flow policy from a policy engine to gateway resources in a network environment according to embodiments herein.

FIG. 4 is an example diagram illustrating distribution of a data flow policy from the policy engine to gateway resources the network environment according to embodiments herein.

In processing operation #8, the service management resource 163 (such as Converged Service Engine) communicates dynamic policy rules associated with the mobile communication device 151 to the backhaul management resource 161 (such as Backhaul Policy Engine). In one embodiment, the backhaul management resource implements or is a policy controller associated with the backhaul 191 and gateway resources such as cable modem termination system (gateway resource 196), EPON, etc.). In one embodiment, the backhaul management resource 161 (such as Backhaul policy Engine) pre-provisions the dynamic policy rules (such as data flow control settings DFCS1 such as generated by the bandwidth management resource or other suitable entity) to apply to data flow (data packets) associated with communications associated with the mobile communication device 151 that are communicated through the backhaul 191.

In one embodiment, processing operation #8 includes the backhaul management resource 161 or other suitable entity communicating corresponding data traffic control information DFCS1 (assigned to the reserved one or more network address XXXY) to one or more entities such as gateway resource 196, gateway resource 195, etc. Such an operation ensures that the gateway resource 195, backhaul 191, and gateway resource 196 are all available for activation and application to any data packets (such as first traffic packets and following traffic packets) that are eventually transmitted from the mobile communication device 151 through wireless base station 131, gateway resource 195, backhaul 191, and gateway resource 196 to a destination device in network 190 as further discussed below. Such an operation also ensures that the gateway resource 195, backhaul 191, and the gateway resource 196 are configured to control flow of data packets (such as via data flow control settings DFCS1) from the network 190 to the wireless base station 131 to the mobile communication device 151 via data flow control settings DFCS1.

At this point, the backhaul 191, gateway resource 195, and gateway resource 196 are pre-configured to support data flow control to packets associated with the mobile communication device 151 before any data packets are even sent by the mobile communication device 151 through to the network 190 or before any data packets are communicated from the network 190 to the mobile communication device 151. The mobile communication device 151 is not yet aware that it has been authenticated and is thus allowed to use wireless services and backhaul 191.

Figure 5:
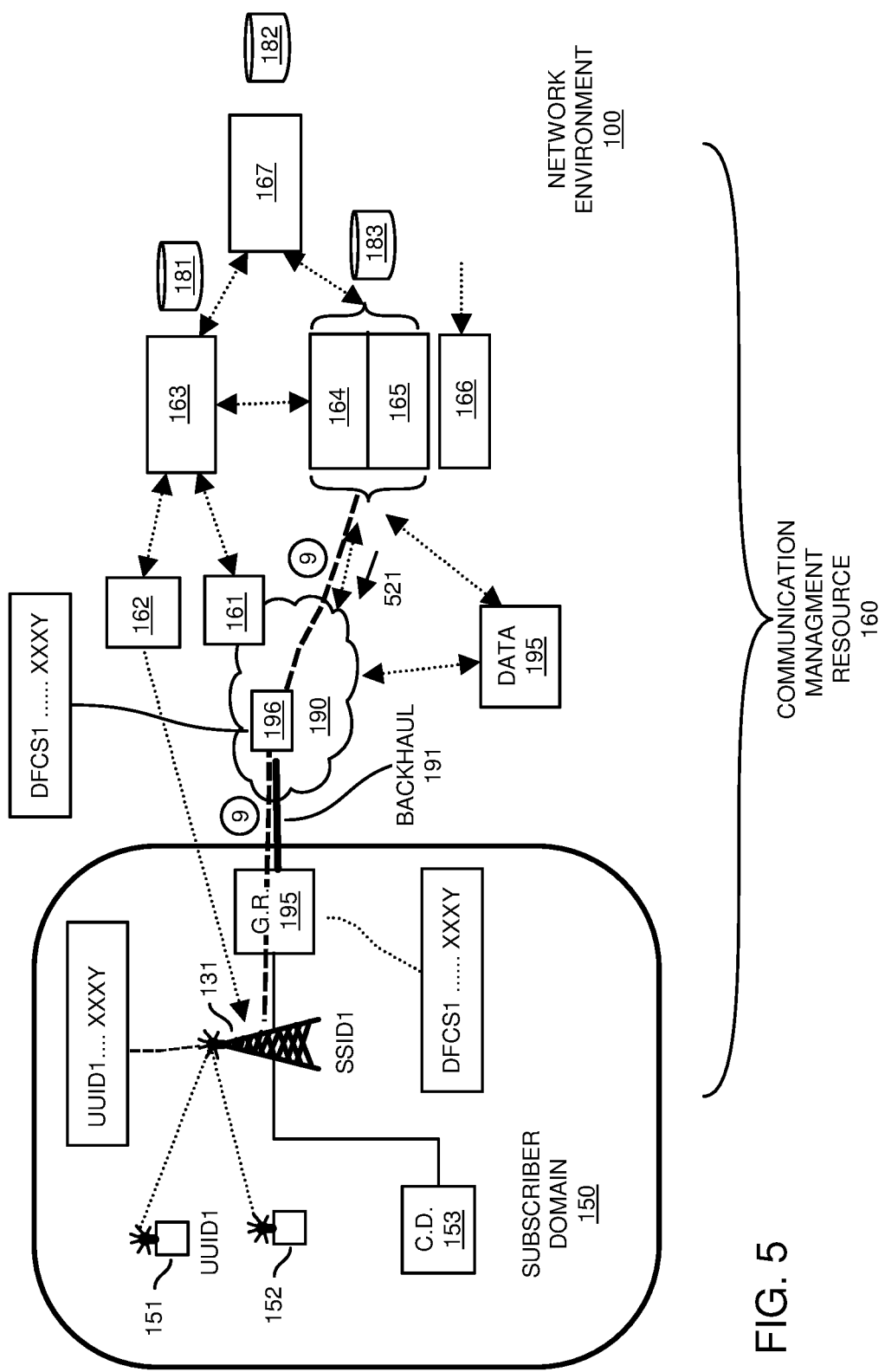
FIG. 5 is an example diagram illustrating communication of an authentication response (success or failure) to a wireless access point according to embodiments herein.

FIG. 5 is an example diagram illustrating communication of an authentication response (success or failure) to a wireless access point according to embodiments herein.

In processing operation #9, the authentication management resource 164 communicates a respective authentication response message 521 to the wireless access point 131 through a combination of gateway resource 196, backhaul 191, and gateway resource 195. Note that the authentication response message 521 can indicate acceptance or rejection of the authentication request 121. In one embodiment, the authentication management resource 164 is a AAA server that sends the authentication response (Access Accept [or] Access Reject) as authentication response message 521 to a NAS or other entity associated with the wireless access point 131.

Figure 6:
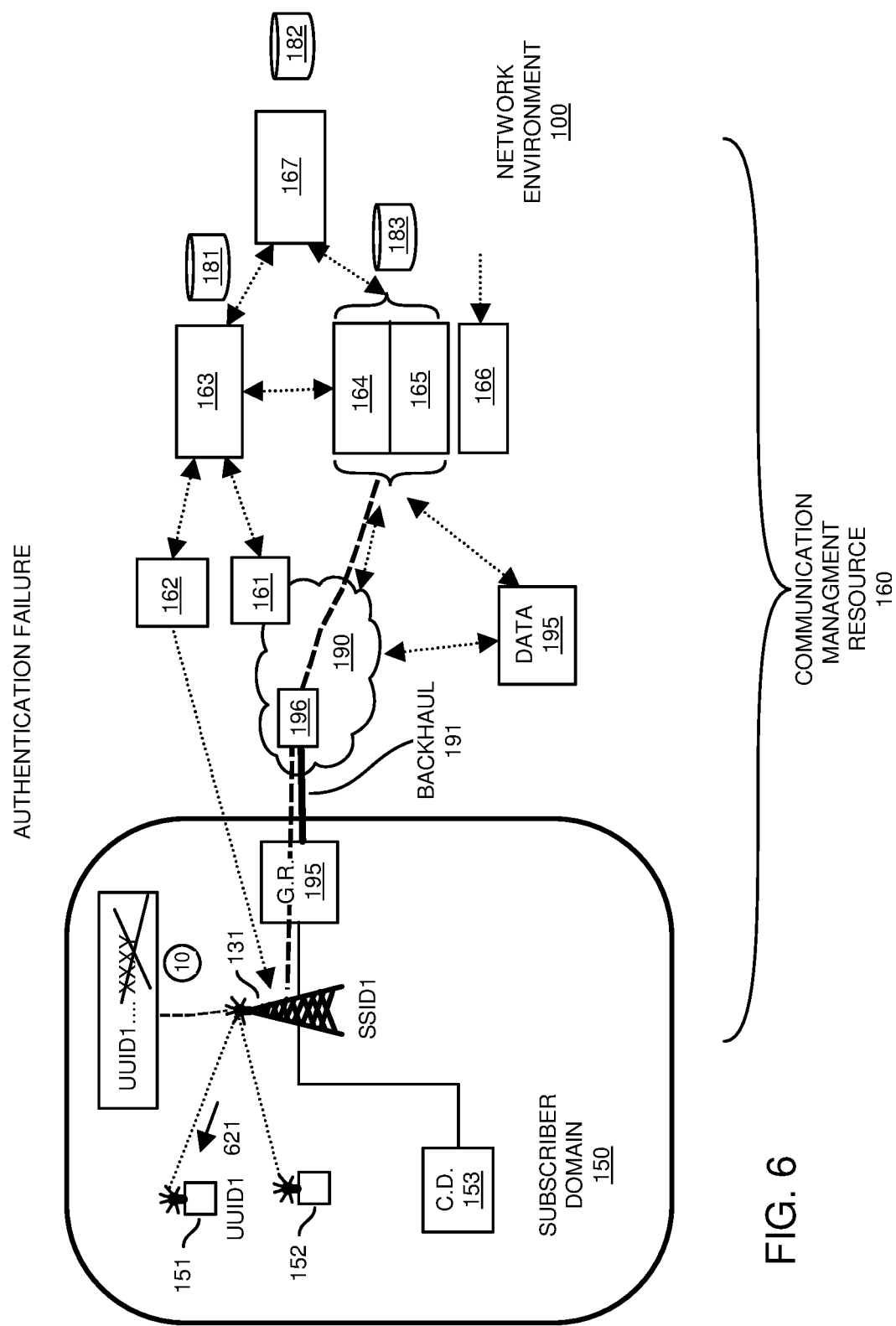
FIG. 6 is an example diagram illustrating operations associated with an authentication failure according to embodiments herein.

FIG. 6 is an example diagram illustrating operations associated with an authentication failure according to embodiments herein.

In processing operation #10, if the authentication response message 521 indicates failed authentication, the authentication management resource 164 or other suitable entity communicates the notification to the wireless access point 131. In such an instance, the wireless access point 131 notifies the mobile communication device 151 of the respective failed authentication via communication 621.

In further example embodiments, in response to the failed authentication, the wireless access point 131 releases the previously reserved network address XXXY (such as IP address) to an available pool of network addresses because it is not going to be used to support communications associated with the mobile communication device 151. Unless authentication is attempted again, call flow associated with the mobile communication device 151 is terminated.

Figure 7:
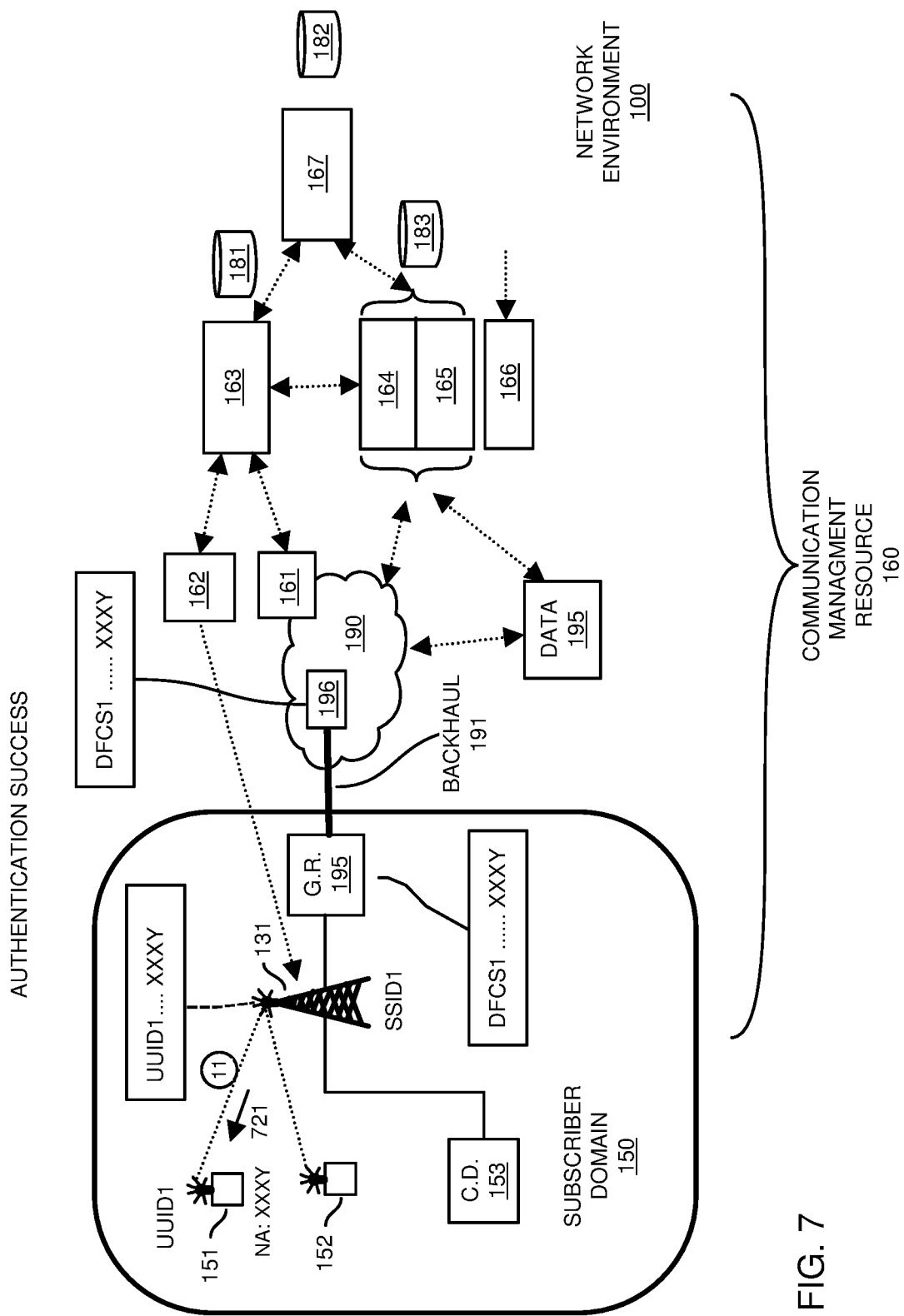
FIG. 7 is an example diagram illustrating operations associated with authentication success and subsequent assignment and/or allowance of use of a respective reserved network address to the mobile communication device according to embodiments herein.

FIG. 7 is an example diagram illustrating assignment of a respective reserved network address to the mobile communication device according to embodiments herein.

In processing operation #11, as a succession to FIG. 5, assume that authentication of the mobile communication device 151 by the authentication management resource 164 results in successful authentication of the mobile communication device 151. In such an instance, the wireless access point 131 transmits communication 721 to the mobile communication device 151. The communications 721 notify the mobile communication device 151 that it may perform DHCPv4 (DORA) and/or DHCPv6 (SARR) address process with the wireless access point 131. The wireless access point 131 notifies the mobile communication device 151 of the assignment of the previously reserved network address XXXY to the mobile communication device 151. Thus, in one embodiment, the wireless access point 131 assigns the respective earlier reserved IP address (XXXY) or multiple previously reserved network addresses to the mobile communication device 151. If desired, the wireless access point 131 can be configured to communicate the network address XXXY to the mobile communication device 151 prior to success or failure of the authentication. In such an instance, in response to completing a successful authentication, the wireless access point 131 notifies the mobile communication device 151 that is now able to use wireless services provided by the wireless access point 131 and backhaul services provided by the gateway resources and backhaul 191 (such as via data flow control settings DFCS1).

Figure 8:
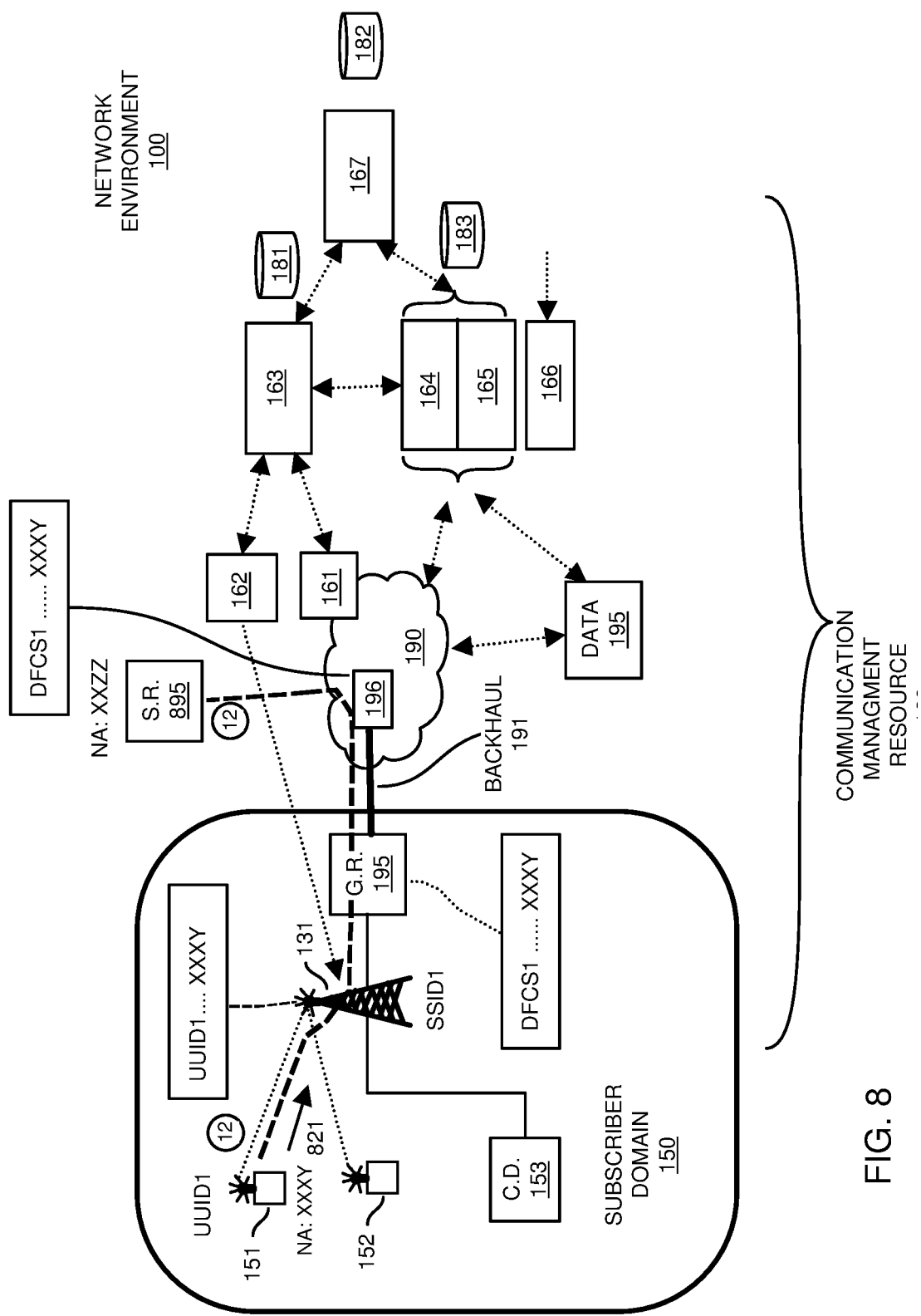
FIG. 8 is an example diagram illustrating application of a respective data flow policy associated with the data packets including the assigned network address according to embodiments herein.

FIG. 8 is an example diagram illustrating application of a respective data flow policy associated with the assigned network address according to embodiments herein.

In processing operation #12, in response to receiving notification that the mobile communication device 151 is now able to use the wireless services provided by the wireless access point 131 and corresponding backhaul 191, the mobile communication device 151 now uses the newly assigned network address XXXY to communicate respective data packets over corresponding wireless communication link to the wireless access point 131. For example, the mobile communication device 151 creates a respective first set of one or more data packets 821, each having a source network address=XXXY and a destination network address=XXZZ. The mobile communication device 151 communicates the first set of one or more data packets 821 over wireless connectivity to the wireless access point 131; the wireless access point 131 communicates the first set of one or more data packets over the backhaul (such as combination of gateway resource 195, backhaul 191, and gateway resource 196).

As previously discussed, prior to completion of the authentication of the mobile communication device 151, the gateway resource 195 is pre-provisioned with a data flow control policy (flow control configuration settings DFCS1) assigned to the mobile communication device 151 and corresponding network address XXXY; the gateway resource 196 is pre-provisioned with a data flow control policy (flow control configuration settings DFCS1) and corresponding network address XXXY assigned to the mobile communication device 151. Thus, upon first data packets observed on network matching flow template, the Back-haul elements as discussed herein invoke and implement the pre-provisioned data flow control policy (configuration settings DFCS1) to any packets conveyed are to be conveyed over the backhaul 191 and having a destination network address or source network address of XXXY.

In other words, subsequent to proper authentication of the mobile communication device 151 and notification to provide service, the gateway resource 195 (such as a cable modem) is configured to inspect the source network address of received data packets from the wireless access point 131 in order to apply the appropriate data flow control policy (configuration settings DFCS1) to any packets originating from the mobile communication device 151 later transmitted over the backhaul 191. In a reverse direction, the gateway resource 196 (such as a cable modem termination system) is configured to inspect the destination network address of received data packets from the network 190 in order to apply the appropriate data flow control policy (configuration settings DFCS1) to any packets originating from the network 190 and transmitted over the backhaul 191 for delivery to the mobile communication device 151.

Note that an uplink data flow control policy assigned to the mobile communication device 151 (and corresponding upstream communications) can be different than the downlink data flow control policy (and corresponding downstream communications) assigned to the mobile communication device 151.

In further processing operations, the communication management system 160 and corresponding components can be configured to implement network disconnect handling such as:

RADIUS Accounting in which:
a. The wireless access point 131 uses delayed accounting techniques to signal the account management resource 165 of accounting information such as Framed IP address and other vendor specific attributes, such as including a unique device identifier value.
b. The wireless access point 131 can be configured to send RADIUS accounting (START, INTERIM and STOP) messages to the respective AAA server. The AAA server will signal these events to the service management resource 163 (Converged Service Engine).
c. When the mobile communication device 151 (a.k.a., user equipment) is disconnected from the wireless access point 131 such as because of any condition including abnormal disconnects (such as network failure) in cases like wireless signal issues (or) inactivity, the wireless access point 131 transmits sends the RADIUS AccountingRequest (STOP) to the authentication management resource 164 (such as AAA server). The authentication management resource 164 relays this information such as via a Network Disconnect Event notification to the service management resource 163 (such as Converged Service Engine).
d. RADIUS accounting STOP or similar notifications received from the service management resource (such as Converged Service Engine) disable respective policy rules configured on the gateway resource 195, backhaul 191, gateway resource 196 (such as CM/ONU).

As further discussed herein, other disconnect options include an Access Point/Gateway (131/195) monitoring the traffic activity; when there is no traffic (i.e., inactivity) for a configured time duration, this is treated as a disconnect condition resulting in cleanup of the dynamic policy rules for that device.

Thus, embodiments herein include the wireless access point 131 receiving a request from communication device 151 (or communication device 153) for wireless access (or wired access such as via communication device 153 implementing the same or similar operations as discussed herein for mobile communication device 151) to a remote network 190. An authentication management resource 164 associated with the communication management resource 160 authenticates the communication device 151 to use the wireless network provided by the wireless access point 131. Prior to providing notification to the communication device 151 that it has been authenticated and/or providing notification to the mobile communication device 151 allowing use of the wireless network SSID1 or wired network, and prior to completing authentication, the communication management resource 160 and corresponding components produce data flow control settings (such as DFCS1) and apply (i.e., activate) the data flow control settings to one or more of gateway resource 195 and gateway resource 196. Thereafter, the communication device 151 is notified that it has been authenticated such as via communications (such as indicating that it is authenticated and/or that it is able to use the backhaul and corresponding wireless access point services) from an authentication resource through wireless base station 131 to the mobile communication device 151. The one or more communication gateway resources associated with backhaul 191 then control flow of data from/to the communication device (through the gateway resources) via implementation of the data flow control settings.

In further example embodiments, as previously discussed, during the authentication, the communication management resource such as associated with the wireless access point 131 reserves a network address XXXY for the communication device 151. Subsequent to the successful authentication of the mobile communication device 151, the communication management resource associated with the wireless access point 131 assigns or allows the communication device 151 use of the network address XXXY support wireless communications. In one embodiment, controlling the flow of data through the communication gateway includes: i) receiving data packets originating from the communication device 151 having a source network address XXXY; and ii) in response to detecting presence of the network address in each of the data packets, providing a level of service of forwarding the data packets (having a source of network address XXXY) through the network 190 to a destination network address in accordance with the assigned data flow control settings DFCS1.

In still further example embodiments, during the authentication, the communication management resource 160 associated with the wireless access point 131: receives a unique identifier value UUID1 assigned to the communication device 151, reserves a network address XXXY for later use by the communication device 151; and derives the data flow control settings DFCS1 based on the unique identifier value UUID1 and/or identity of a respective user operating the mobile communication device 151. In one embodiment, the communication management resource is able to map an identity of the mobile communication device UUID1 to a corresponding identity of a user of the mobile communication device 151. The communication management resource 160 further produces a mapping between the network address XXXY and the data flow control settings DFCS1 for use by the backhaul and corresponding gateway resources. In one embodiment, as previously discussed, the communication gateway resource 195 is a cable modem (such as gateway resource 195) disposed in a respective subscriber domain 150.

In accordance with further embodiments, authentication of the communication device 151 includes: receiving a communication from a wireless access point 131 to which the communication device 151 requests use of wireless access services; and via the authentication management resource 164, authenticating the communication device 151 via communications conveyed from the wireless access point 131 through the communication gateway 195 to the authentication management resource 164.

Subsequent to authentication, the communication management resource 160 (such as gateway resources) as discussed herein monitors the flow of data between the communication device 151 and the remote network 190 through the backhaul 191. The communication management resource 160 or other suitable entity terminates use of the data flow control settings DFCS1 and the network address XXXY assigned to the communication device 151 in response to detecting a condition such as that the flow of data falls below a threshold level for a certain period of time such as indicating that the mobile communication device 151 is no longer using the wireless access point 131 and corresponding backhaul 191 to access the network 190.

In still further example embodiments, as previously discussed, the communication management resource 160 configures the communication gateways 195 and/or 196 with the data flow control settings DFCS1 prior to the authentication management resource 164 or other suitable entity providing notification to the mobile communication device of successful authentication of the communication device 151. Thus, in one embodiment, the communication gateways are configured with the data flow control settings DFCS1 prior to providing notice (such as a command) to the communication device 151 that the communication device has been authenticated and/or it is allowed it to use the wireless base station 131 and/or backhaul 191 to access the remote network 190.

Yet further embodiments herein include, via the communication management resource 160, detecting an identity UUID1 of the communication device 151 during the authentication process; determining a quality of service to provide to the communication device 151 based on the determined identity UUID1 or corresponding user of mobile communication device 151; and producing the data flow control settings DFCS1 to provide the determined quality of service. In such an instance, it is possible to provide the newly authenticated user of the mobile communication device 151 or the user herself of appropriate quality of service. Such a quality of service may be better than a corresponding quality of service provided by the communication device 153 accessing the network 190 through the respective gateway resource 195, backhaul 191, and gateway resource 196.

In other words, embodiments herein include potentially providing a higher level of quality of service to the mobile communication device 151 such as based on a level of service assigned to the corresponding user of the mobile communication device 151. For example, if the authentication management resource 164 or other suitable entity in the network environment determines that the user of the mobile communication device 151 is a user that has subscribed to a better service plan or the corresponding device is allowed to get better service at the present location such as subscriber domain 150 (e.g., at Home private network) with respect to other users in the subscriber domain 150, the authentication management resource 164 and/or service management resource 163 assigns an appropriate higher quality of service to the user via the data flow control settings DFCS1.

Further, in a manner as previously discussed, controlling the flow of data through the communication gateway includes implementing a quality of service (such as minimum or maximum bandwidth, maximum latency, etc.) as specified by the data flow control settings DFCS1 via a communication pathway including the wireless access point, a cable modem, and a cable modem termination system; and via the wireless access point, providing wireless connectivity to the communication device.

As previously discussed, conventional techniques include customer devices connecting to an In-Home private Wi-Fi™ solution. It is desirable to provide such mobile communication devices (such as mobile communication device 151, 152, etc.) a more elevated level of service in terms of throughput, prioritization, and user experience compared to other devices provided connectivity (such as communication device 153 or other communication devices) through a respective wireless access point 131. In contrast to conventional out of band message-based solutions based on post-authentication phase and user-space applications-based solutions, (such as those closely tied to centralized policy engines), embodiments herein include provisioning of proper dynamic service policy rules during a respective authentication phase (process) of authenticating the device.

FIGS. 9-16 illustrate a second example of implementing dynamic service policies in a network environment according to embodiments herein.

Figure 9:
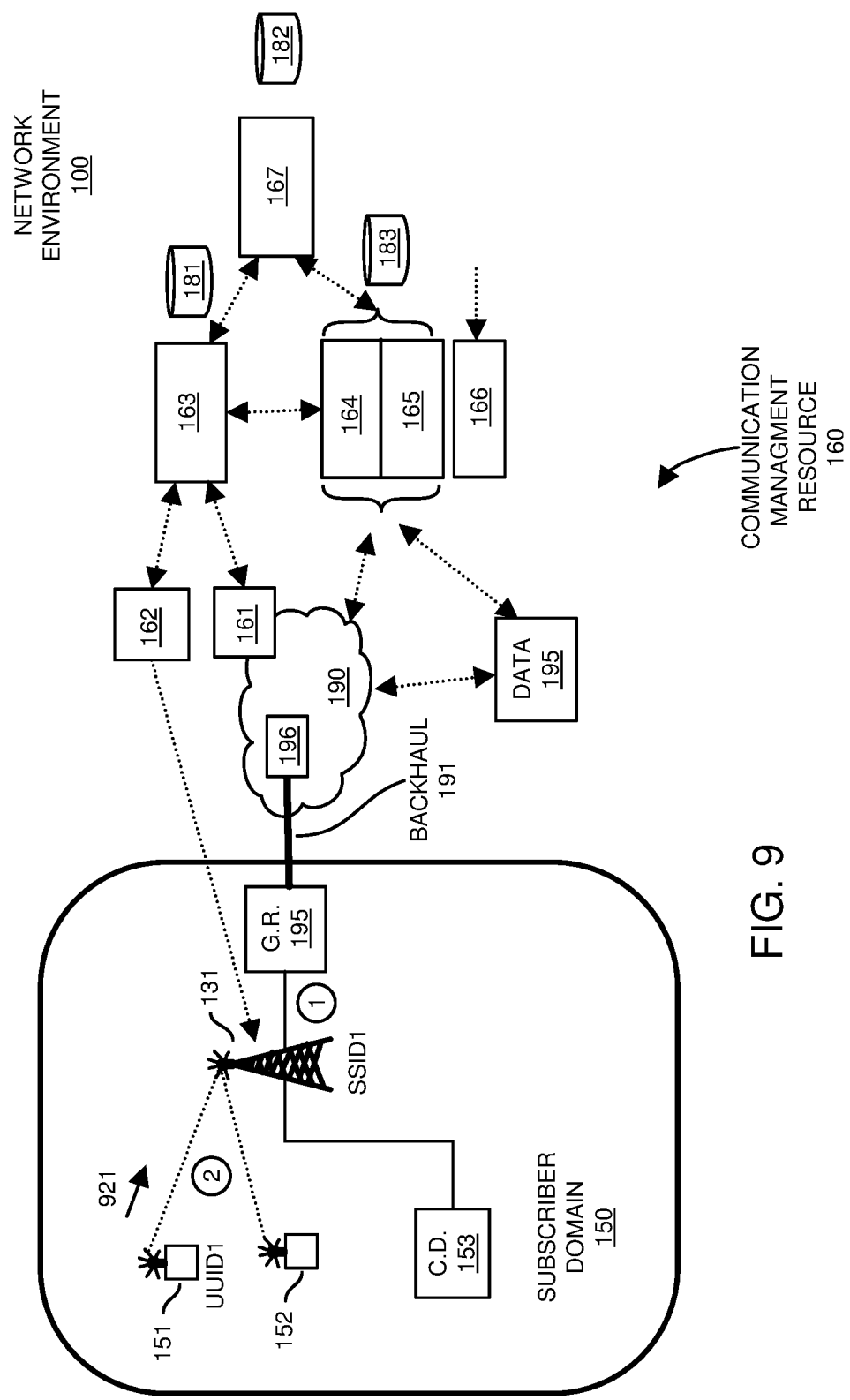
FIG. 9 is an example diagram illustrating backhaul discovery and association of a mobile communication device with a wireless access point according to embodiments herein.

FIG. 9 is an example diagram illustrating backhaul discovery and association of a mobile communication device with a wireless access point according to embodiments herein.

In operation #1 of FIG. 9, the wireless base station 131 discovers backhaul entity resources associated with backhaul 191 (e.g. CM, ONU, gateway resource 195, gateway resource 196, etc.) including information associated with the backhaul entities. For example, the wireless base station 131 receives/retrieves information such as transport details (a network address or MAC address assigned to the gateway resource 195, 196, such as respective IPv4 and IPv6 addresses), source port range (MAP-T False cases), etc. This information associated with the one or more backhaul resources (such as gateway resource 195, backhaul 191, gateway resource 196, etc.) is used in a later phase of call flow for upstream to build appropriate Dynamic Service flow rules (i.e., data flow control settings).

In further example embodiments, the wireless access point 131 broadcasts an available network name such as SSID1 in the subscriber domain 150. In such an instance, via wireless broadcast communications from the wireless access point 131, each of the communication devices in the subscriber domain 150 is made aware of the availability of the wireless access point 131 and wireless network SSID1.

Additionally, in operation #2 of FIG. 9, assume that the mobile communication device 151 detects a private and/or public in home Wi-Fi networks (such as network as identified by network name SSID1) disposed in subscriber domain 150 via the broadcast of SSID1. The communication device 151 attempts to associate with the known network such as SSID1 (or) a user of the mobile communication device 151 may select a network in which to associate itself with that wireless network provided by the wireless access point 131.

To establish a wireless communication link and access network 190, in one embodiment, the communication device 151 wirelessly transmits communications 921 such as including a respective request to establish wireless connectivity with the wireless base station 131.

Thus, the wireless access point 131 receives a request from communication device 151 for wireless access to a remote network 190.

Figure 10:
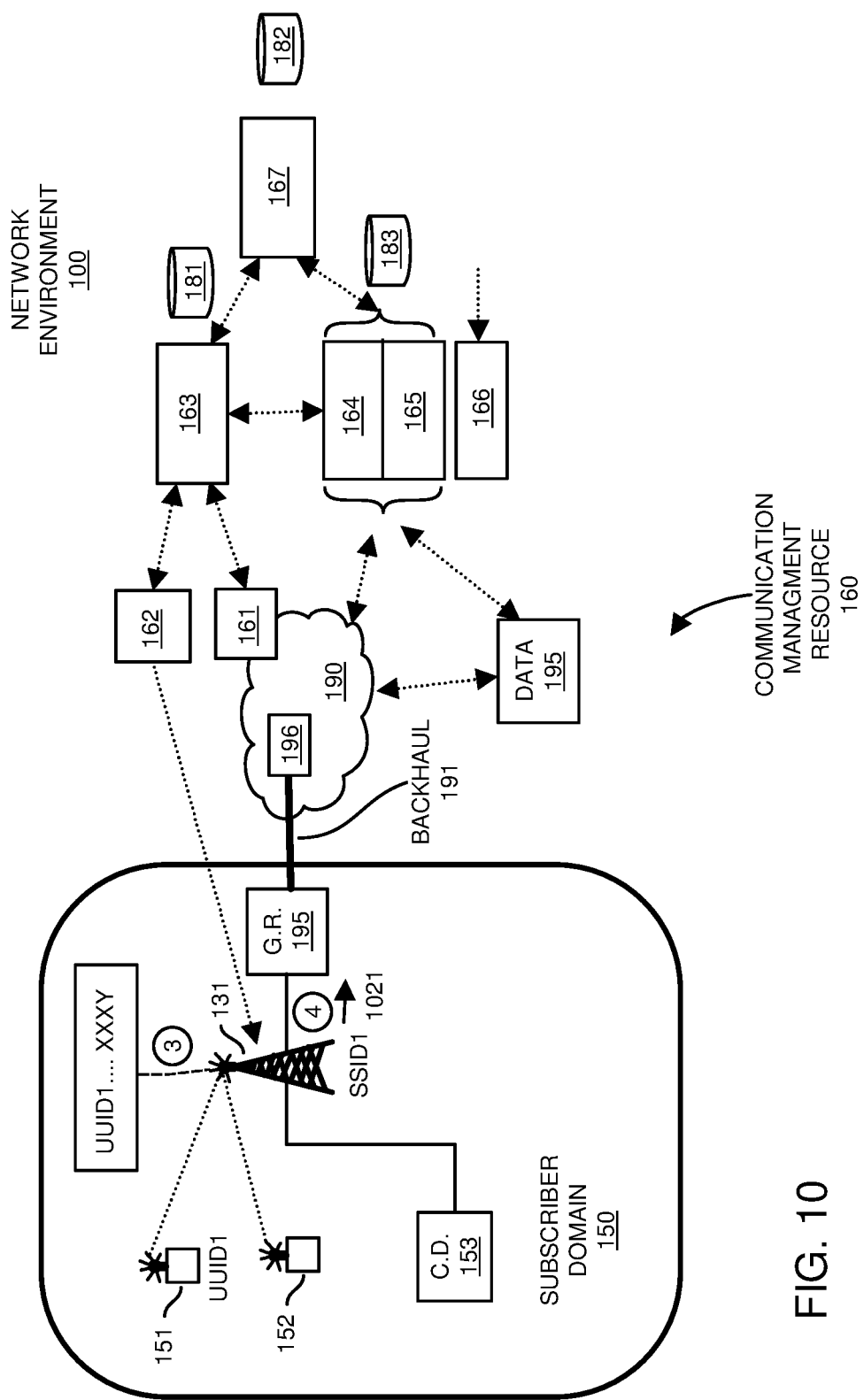
FIG. 10 is an example diagram illustrating reservation of a network address and communication of an authentication request from a wireless access point according to embodiments herein.

FIG. 10 is an example diagram illustrating reservation of a network address and communication of an authentication request from a wireless access point according to embodiments herein.

In processing operation #3 of FIG. 10, in response to receiving the request to use wireless services of the wireless access point 131, the wireless access point 131 determines a type of authentication method to be used by the mobile configuration device 151 to authenticate itself for use of the backhaul 191 and access to remote network 190. In one embodiment, in processing operation #3, the wireless access point 131 or other suitable entity reserves a respective network address XXXY (any suitable network address such as an IPV4 and/or IPv6 address, etc.) for use by the mobile communication device 151 at a later time. In one embodiment, the network address XXXY reserved for use is obtained from a respective pool of available network addresses. Note that devices can be stacked. In such an instance, the wireless access point or other suitable entity can be configured to reserve multiple network address such as one or more IPv4 network addresses and one or more IPv6 network addresses for possible use by the mobile communication device.

In processing operation #4 of FIG. 10, the wireless access point 131 acts as NAS/RADIUS client, and via communications 1021, sends an authentication request (such as RADIUS Access Request) with required AVP's (such as Attribute Value Pairs associated with a respective authentication protocol) and VSA's (Vendor specific attributes) over the communication path from the wireless base station 131 through the gateway resource 195, backhaul 191, gateway resource 196, to the authentication management resource 164 to provide notification of the authentication method to be used by the authentication management resource 164 to authenticate the mobile communication device 151.

Additionally, in one embodiment, the wireless access point 131 communicates information such as the reserved IP network address (such as value XXXY), details for device and Back-haul element IP address details to AAA server, etc. In one embodiment, the back-haul edge element such as gateway resource 195 (e.g., Cable Modem, Optical Network Terminal, etc.) may act as RADIUS proxy (or) snooping the RADIUS packets from the wireless access point 131 and build the device session context for managing the dynamic service flow rules received in RADIUS (or) on API from Network.

Figure 11:
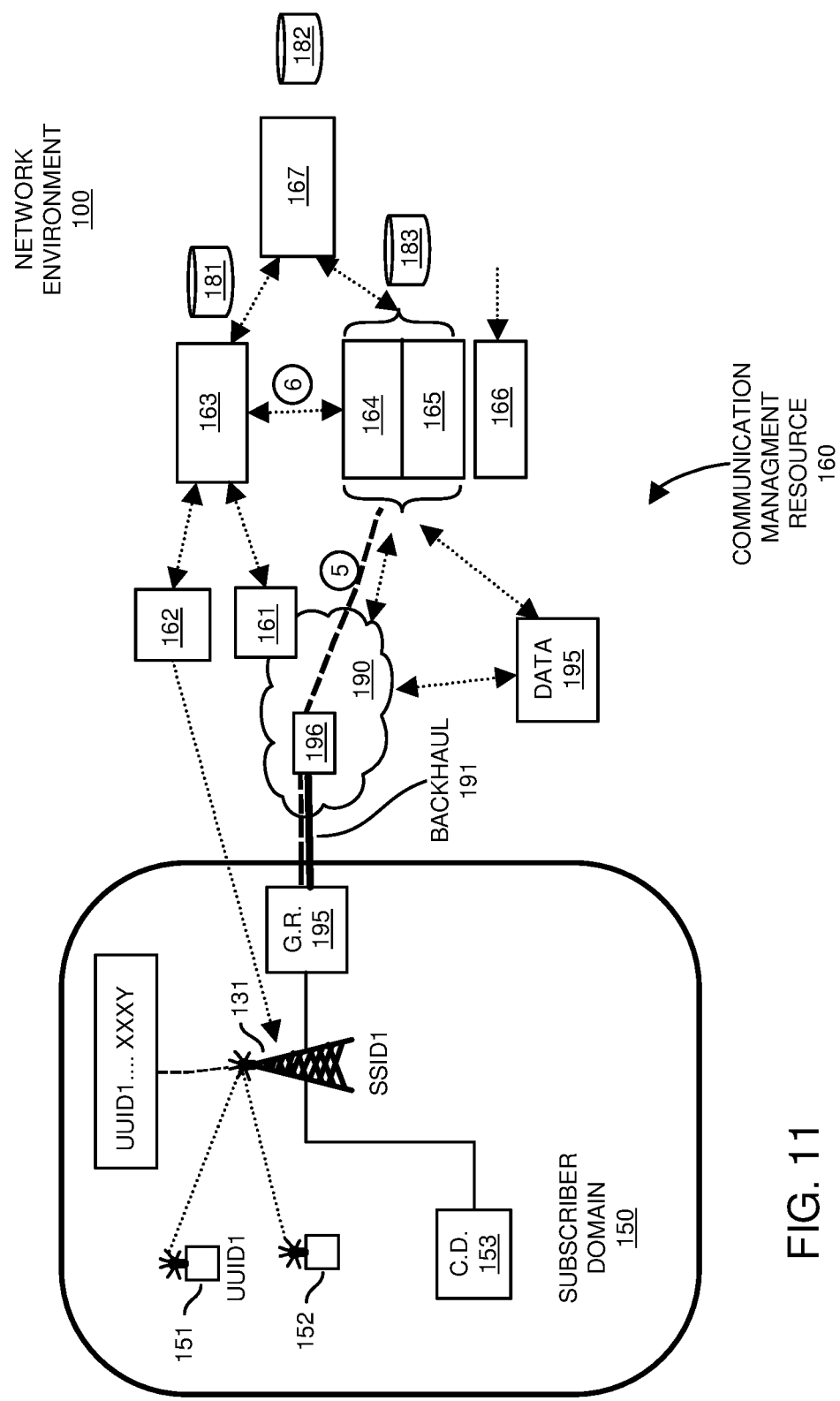
FIG. 11 is an example diagram illustrating device authentication and communication of mobile communication device information to a policy engine for implementation/generation of a policy according to embodiments herein.

FIG. 11 is an example diagram illustrating device authentication and communication of mobile communication device information to a policy engine for implementation/generation of a policy according to embodiments herein.

In operation #5 of FIG. 11, the authentication management resource 164 (such as AAA server) performs the authentication of the mobile communication device 151 and may persist the authentication method used in local context such as a type of specified by the mobile communication device, wireless access point, etc. Authentication may include the mobile communication device 151 communicating information such as password, username, etc., to the authentication management resource 164 as required by the authentication management resource 164 and corresponding authentication implemented by it to authenticate the mobile communication device 151.

In operation #6 of FIG. 11, during authentication of the mobile communication device 151, or upon successful authentication, the authentication management resource 164 provides notification (such as via a signal device Connecting/join notification) to the network access service management resource 163 (such as Converged Service Engine). The notification may include information such as specific authentication model used to authenticate the mobile communication device 151, data traffic flow template information, information about the backhaul 191 and corresponding gateway resources (such as their identities and/or network addresses) to classify the requesting communication device 151 and to retrieve the appropriate policy in which to apply to data flow (communication of data packets) associated with the communication device 151 communicating through the gateway resources and corresponding backhaul 191.

Figure 12:
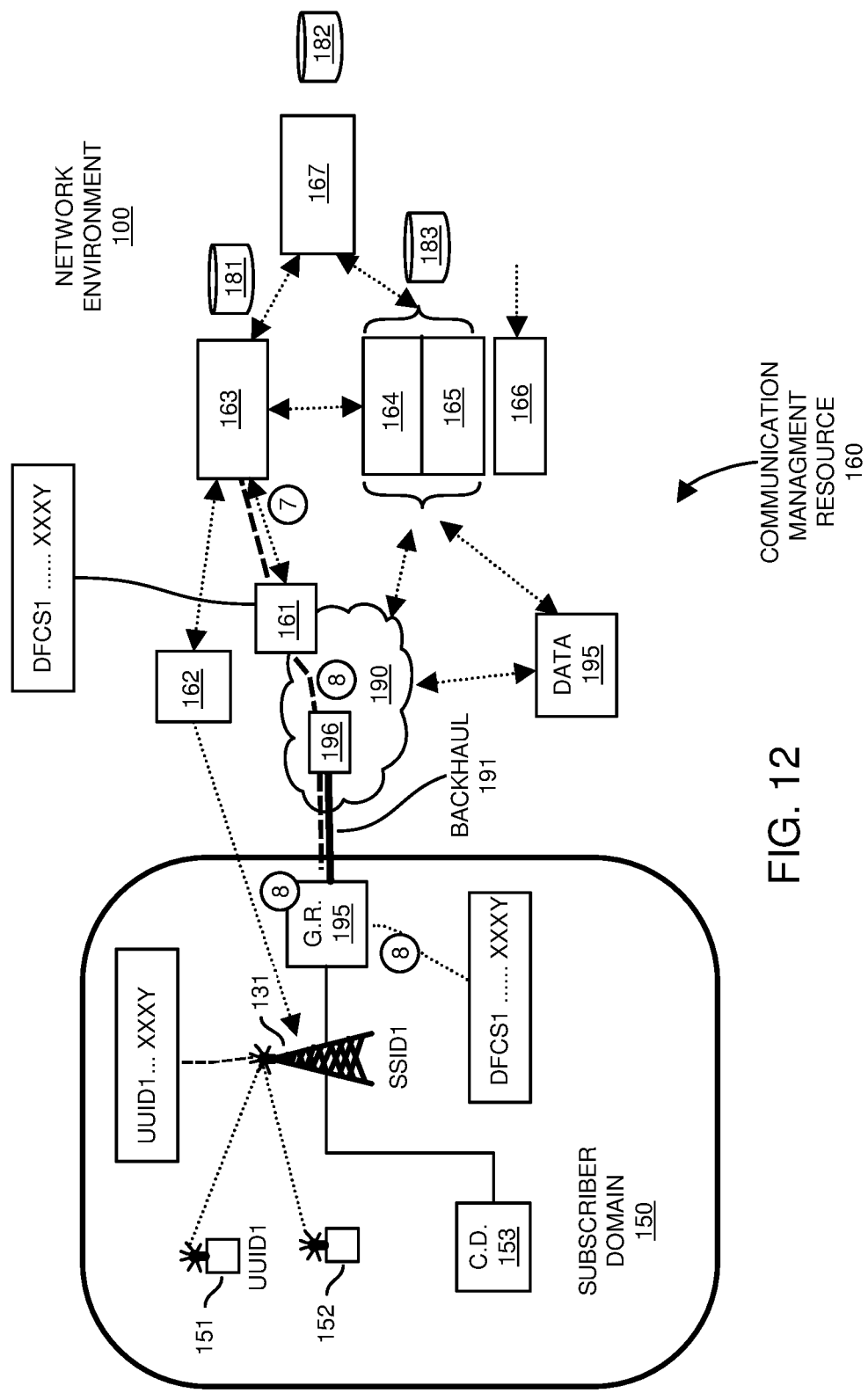
FIG. 12 is an example diagram illustrating distribution of a data flow policy from a policy engine to gateway resources the network environment according to embodiments herein.

FIG. 12 is an example diagram illustrating distribution of a data flow policy from the policy engine to gateway resources the network environment according to embodiments herein.

In processing operation #7 of FIG. 12, the service management resource 163 (such as Converged Service Engine) communicates dynamic policy rules associated with the mobile communication device 151 to the backhaul management resource 161 (such as Backhaul Policy Engine). In one embodiment, the backhaul management resource implements or is a policy controller associated with the backhaul 191 and gateway resources such as cable modem termination system (gateway resource 196), EPON, etc.). In one embodiment, the backhaul management resource 161 (such as Backhaul policy Engine) pre-provisions (activates) the dynamic policy rules (such as data flow control settings DFCS1) to apply to data flow (data packets) associated with communications associated with the mobile communication device 151 that are communicated through the backhaul 191.

In one embodiment, processing operation #8 of FIG. 12 includes the backhaul management resource 161 communicating corresponding data traffic control information such as DFCS1 (assigned to the reserved network address XXXY) to one or more entities such as gateway resource 196, gateway resource 195, etc. Such an operation ensures that the gateway resource 195, backhaul 191, and gateway resource 196 are all available for activation and application to any data packets (such as first traffic packets and following traffic packets) that are eventually transmitted from the mobile communication device 151 through wireless base station 131, gateway resource 195, backhaul 191, and gateway resource 196 to a destination device in network 190 as further discussed below. Such an operation also ensures that the gateway resource 195, backhaul 191, and the gateway resource 196 are configured to control flow of data packets from the network 190 to the wireless base station 131 to the mobile communication device 151 via data flow control settings DFCS1.

At this point, the backhaul 191, gateway resource 195, and gateway resource 196 are pre-configured to support data flow control to packets associated with the mobile communication device 151 before any data packets are even sent by the mobile communication device 151 through to the network 190 or before any data packets are communicated from the network 190 to the mobile communication device 151.

Thus, in processing operation #8, the bandwidth management resource 161 such as Backhaul policy Engine pre-provisions the dynamic policy rules (such as data flow control settings DFCS1 to the respective gateway resources (such as CM/ONU., etc.), set to implement on first traffic packet arrival from the mobile communication device 151.

Figure 13:
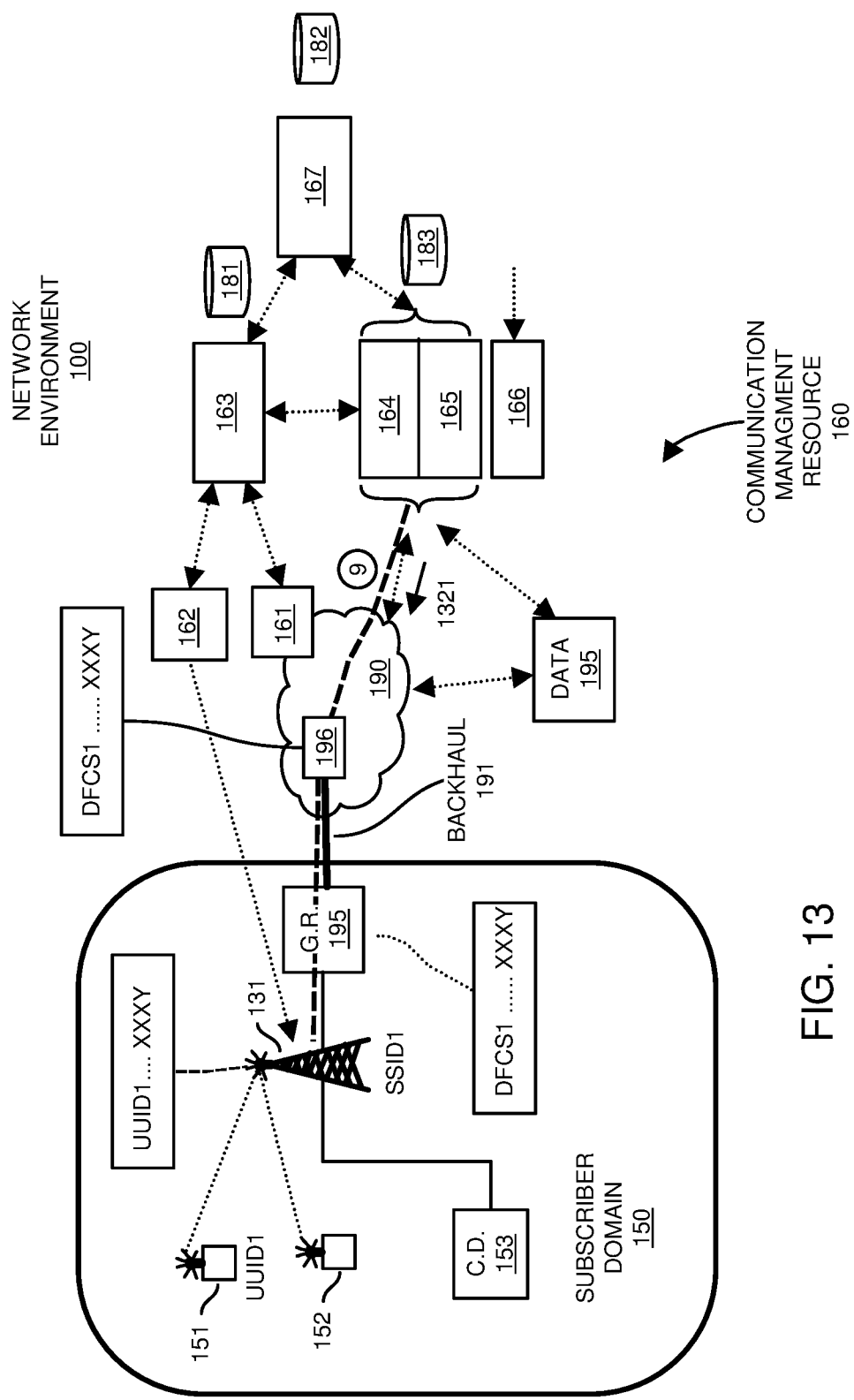
FIG. 13 is an example diagram illustrating communication of an authentication response (success or failure) to a wireless access point according to embodiments herein.

FIG. 13 is an example diagram illustrating communication of an authentication response (success or failure) to a wireless access point according to embodiments herein.

In processing operation #9 of FIG. 13, the authentication management resource 164 communicates a respective authentication response message 1321 to the wireless access point 131 through a combination of gateway resource 196, backhaul 191, and gateway resource 195. Note that the authentication response message 1321 can indicate acceptance or rejection of the prior authentication request 921. In one embodiment, the authentication management resource 164 is a AAA server that sends the authentication response (Access Accept [or] Access Reject) as authentication response message 1321 to a NAS or other entity associated with the wireless access point 131.

Figure 14:
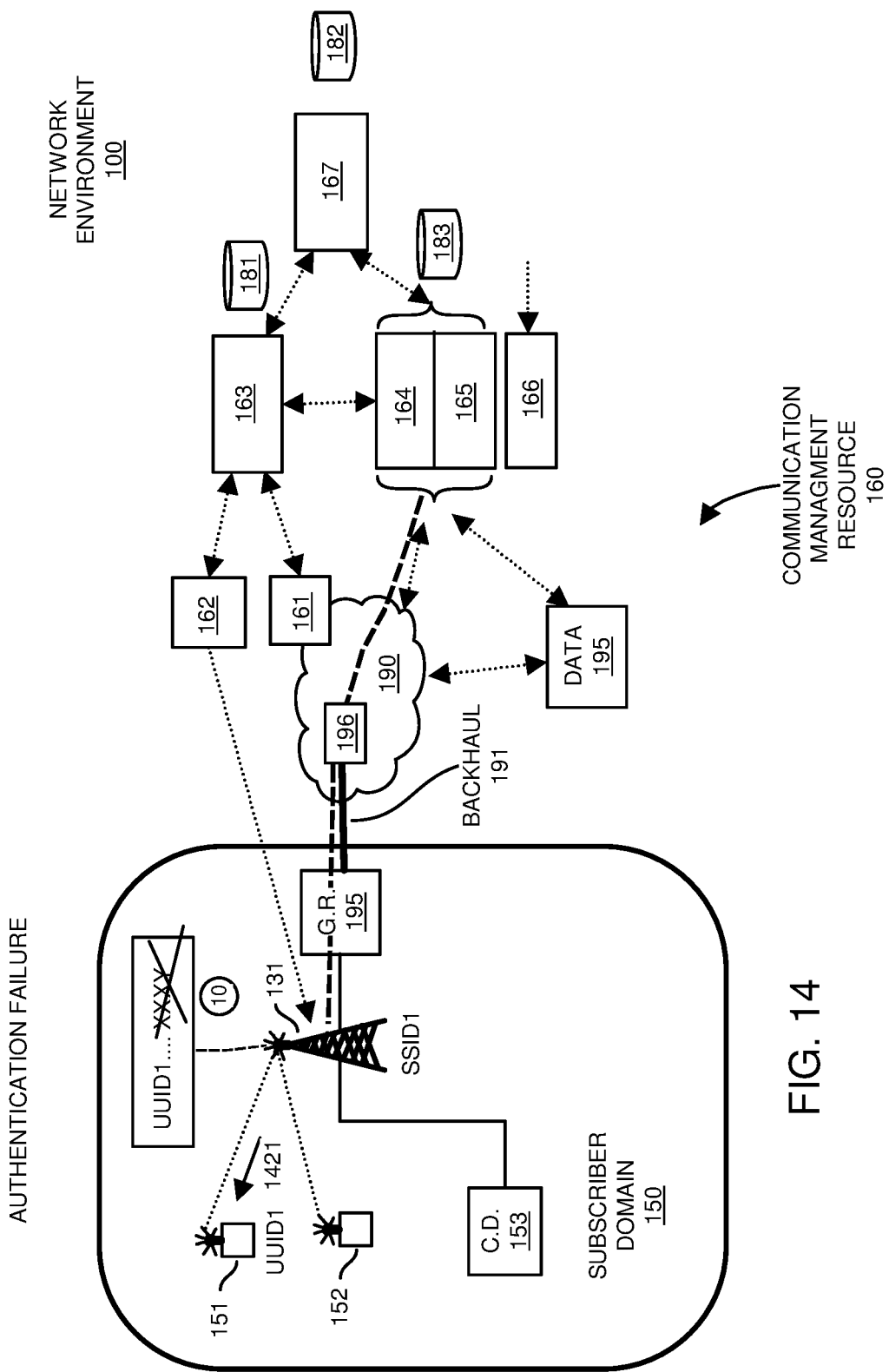
FIG. 14 is an example diagram illustrating operations associated with an authentication failure according to embodiments herein.

FIG. 14 is an example diagram illustrating operations associated with an authentication failure according to embodiments herein.

In processing operation #10 of FIG. 14, if the authentication response message 1321 indicates failed authentication, the authentication management resource 164 or other suitable entity communicates notification to the wireless access point 131. In such an instance, the wireless access point 131 notifies the mobile communication device 151 of the respective failed authentication via communications 1421. In further example embodiments, in response to the failed authentication, the wireless access point 131 releases the previously reserved network address XXXY (such as IP address) to an available pool of network addresses because it is not going to be used to support communications associated with the mobile communication device 151. Unless authentication is attempted again, call flow associated with the mobile communication device 151 is terminated.

Figure 15:
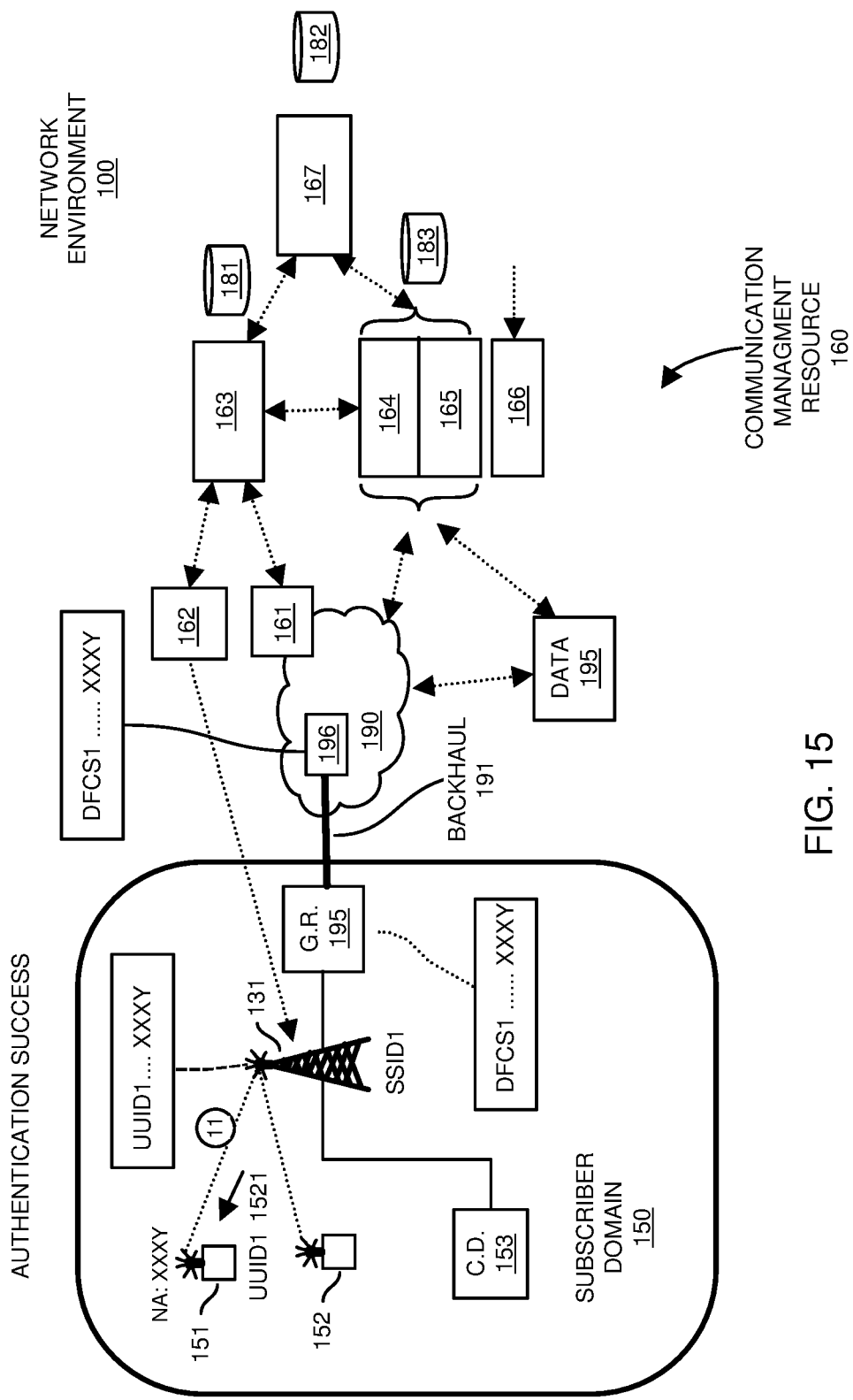
FIG. 15 is an example diagram illustrating operations associated with assignment of a respective reserved network address to the mobile communication device according to embodiments herein.

FIG. 15 is an example diagram illustrating assignment of a respective reserved network address to the mobile communication device according to embodiments herein.

In processing operation #11 of FIG. 15, as a succession to FIG. 13, assume that authentication of the mobile communication device 151 by the authentication management resource 164 results in successful authentication of the mobile communication device 151. In such an instance, the wireless access point 131 transmits communication 1521 to the mobile communication device 151. The communications 1521 notify the mobile communication device 151 that it may perform DHCPv4 (DORA) and/or DHCPv6 (SARR) address process with the wireless access point 131. The wireless access point notifies the mobile communication device 151 of the assignment of the reserved network address XXXY to the mobile communication device 151. Thus, in one embodiment, the wireless access point 131 assigns the respective earlier reserved IP address (XXXY) or multiple previously reserved network addresses to the mobile communication device 151. If desired, the wireless access point 131 can be configured to communicate the network address XXXY to the mobile communication device 151 prior to success or failure of the authentication. In such an instance, in response to completing a successful authentication, the wireless access point 131 notifies (such as via a command to) the mobile communication device 151 that is now able to use wireless services provided by the wireless access point 131 and backhaul services provided by the gateway resources and backhaul 191.

Figure 16:
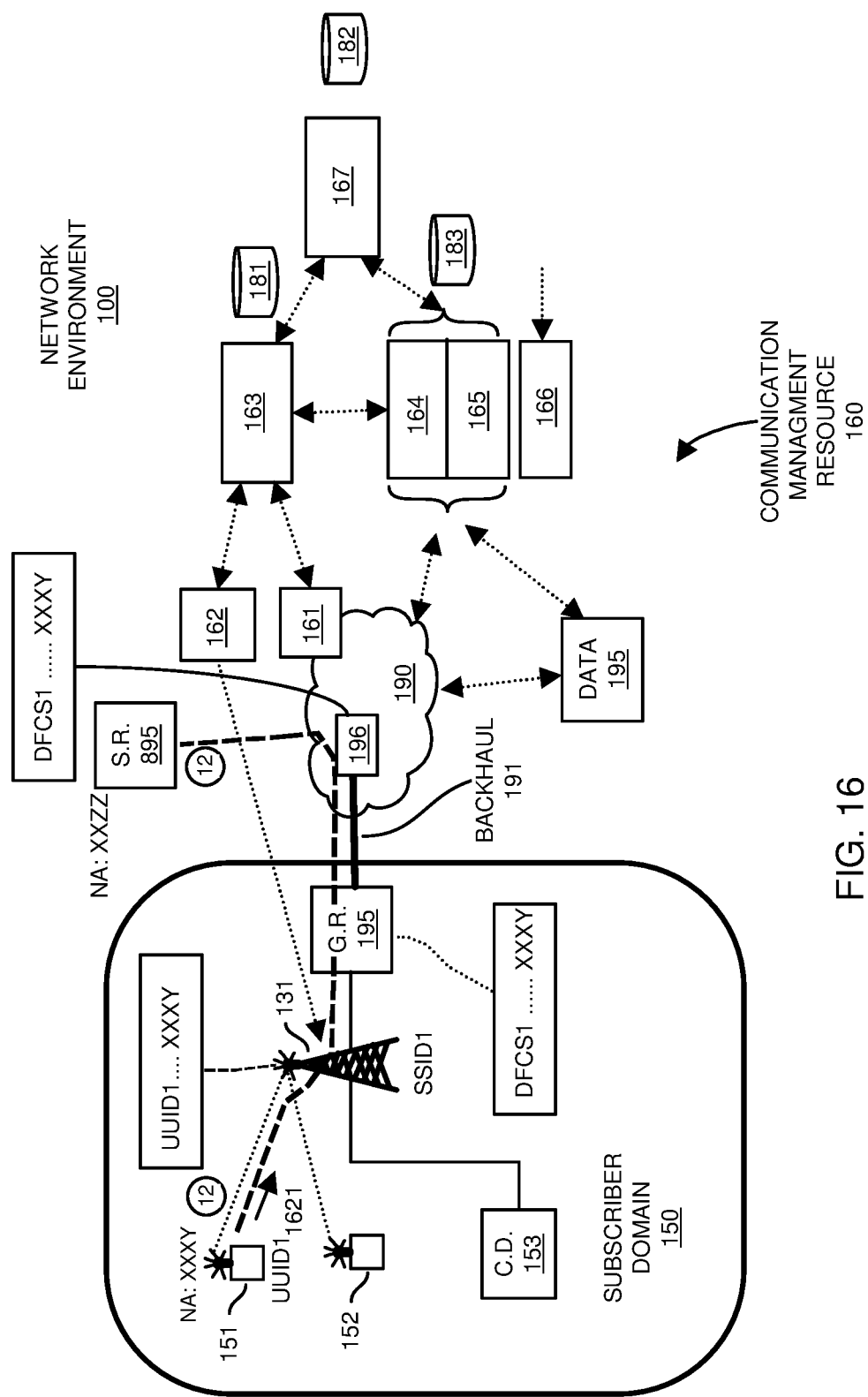
FIG. 16 is an example diagram illustrating application of a respective data flow policy associated with the assigned network address according to embodiments herein.

FIG. 16 is an example diagram illustrating application of a respective data flow policy associated with the assigned network address according to embodiments herein.

In processing operation #12 of FIG. 16, in response to receiving notification that the mobile communication device 151 is now able to use the wireless services provided by the wireless access point 131, or notification that wireless access point 131 and/or backhaul 191 is now configured to support communications originating from the mobile communication device 151, the mobile communication device 151 in response now uses the newly assigned network address XXXY to communicate respective data packets over corresponding wireless communication link to the wireless access point 131. For example, the mobile communication device 151 creates a respective first one or more data packets 1621, each having a source network address=XXXY and a destination network address=XXZZ. The mobile communication device 151 communicates the first one or more data packets 1621 over wireless connectivity to the wireless access point 131; the wireless access point 131 communicates the first one or more data packets over the backhaul (such as combination of gateway resource 195, backhaul 191, and gateway resource 196).

As previously discussed, the gateway resource 195 and gateway resource 196 are both pre-provisioned with a data flow control policy (flow control configuration settings DFCS1) assigned to the mobile communication device 151 and corresponding network address XXXY prior to the mobile communication device 151 being notified that it is able to use wireless services by the wireless access point 131. Thus, upon first data packets observed on network 131 matching flow template, the Back-haul elements as discussed herein invoke and implement the pre-provisioned data flow control policy (configuration settings DFCS1) to any packets conveyed are to be conveyed over the backhaul 191 and having a destination network address or source network address of XXXY.

In other words, subsequent to proper authentication of the mobile communication device 151 and notification to the mobile communication device 151 that wireless services are now available for use, the gateway resource 195 (such as a cable modem) is inspects the source network address of received data packets from the wireless access point 131 in order to activate the data flow control settings DFCS1 and apply the appropriate data flow control policy (configuration settings DFCS1) to any packets originating from the mobile communication device 151 (having source network address XXXY) later transmitted over the backhaul 191. In a reverse direction, the gateway resource 196 (such as a cable modem termination system) inspects the destination network address of received data packets from the network 190 in order to apply the appropriate data flow control policy (configuration settings DFCS1) to any packets originating from the network 190 and transmitted over the backhaul 191 for delivery to the mobile communication device 151 (i.e., network address XXXY).

Note that an uplink data flow control policy assigned to the mobile communication device 151 (and corresponding upstream communications) can be different than the downlink data flow control policy (and corresponding downstream communications) assigned to the mobile communication device 151.

In further processing operations, the communication management system 160 and corresponding components can be configured to implement network disconnect handling such as:

Option-01: RADIUS Accounting in which:
  a. The wireless access point 131 uses delayed accounting techniques to signal the account management resource 165 of accounting information such as Framed IP address and other vendor specific attributes.
  b. The wireless access point 131 can be configured to send RADIUS accounting (START, INTERIM and STOP) messages to the respective AAA server. The AAA server will signal these events to the service management resource 163 (Converged Service Engine).
  c. When the mobile communication device 151 (a.k.a., user equipment) is disconnected from the wireless access point 131 such as because of any condition including abnormal disconnects (such as network failure) in cases like wireless signal issues (or) inactivity, the wireless access point 131 transmits sends the RADIUS AccountingRequest (STOP) to the authentication management resource 164 (such as AAA server). The authentication management resource 164 relays this information such as via a Network Disconnect Event notification to the service management resource 163 (such as Converged Service Engine).
  d. RADIUS accounting STOP or similar notifications received from the service management resource (such as Converged Service Engine) disable respective policy rules configured on the gateway resource 195, backhaul 191, gateway resource 196 (such as CM/ONU).

Figure 17:
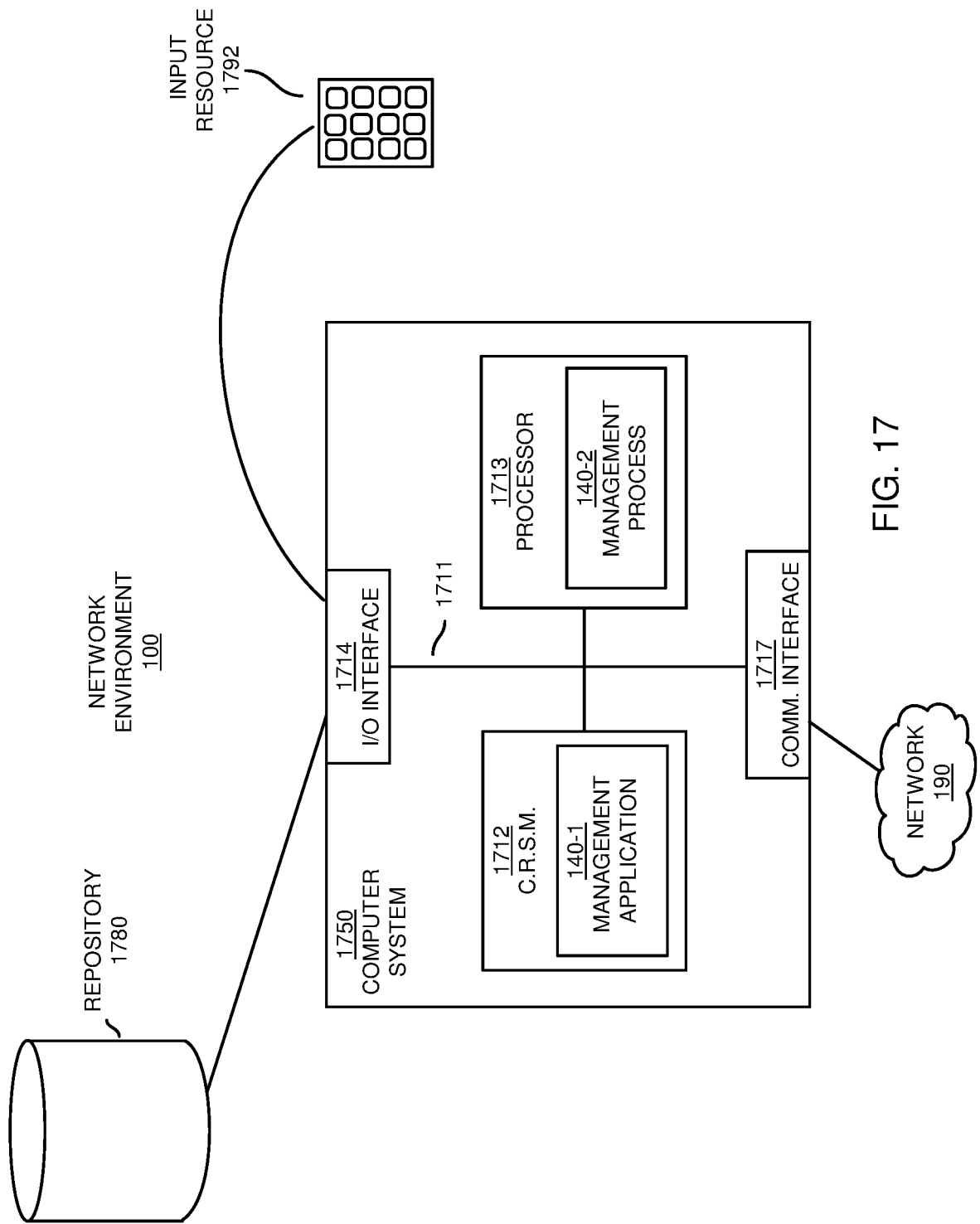
FIG. 17 is a diagram illustrating example computer architecture operable to execute one or more operations according to embodiments herein.

FIG. 17 is an example block diagram of a computer system for implementing any of the operations as previously discussed according to embodiments herein.

Any of the resources (such as backhaul management resource 161, policy management resource 162, service management resource 163, authentication management resource 164, account management resource 165, cable modem server 166, record management resource 167, backhaul 191, gateway resource 195, gateway resource 196, etc.) as discussed herein can be configured to include computer processor hardware, analog/digital circuitry, and/or corresponding executable instructions to carry out the different operations as discussed herein.

As shown, computer system 1750 of the present example includes an interconnect 1711 that couples computer readable storage media 1712 such as a non-transitory type of media (i.e., any type of hardware storage medium) in which digital information can be stored and retrieved, a processor 1713, I/O interface 1714, and a communications interface 1717.

I/O interface(s) 1714 supports connectivity to repository 1780 and input resource 1792.

Computer readable storage medium 1712 can be any hardware storage device such as memory, optical storage, hard drive, floppy disk, etc. In one embodiment, the computer readable storage medium 1712 stores instructions and/or data.

As shown, computer readable storage media 1712 can be encoded with management application 140-1 (e.g., including instructions) to carry out any of the operations as discussed herein.

During operation of one embodiment, processor 1713 accesses computer readable storage media 1712 via the use of interconnect 1711 in order to launch, run, execute, interpret or otherwise perform the instructions in management application 140-1 stored on computer readable storage medium 1712. Execution of the management application 140-1 produces management process 140-2 to carry out any of the operations and/or processes as discussed herein.

Those skilled in the art will understand that the computer system 1750 can include other processes and/or software and hardware components, such as an operating system that controls allocation and use of hardware resources to management application 140-1.

In accordance with different embodiments, note that computer system may reside in any of various types of devices, including, but not limited to, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 1750 may reside at any location or can be included in any suitable resource in any network environment to implement functionality as discussed herein.

Functionality supported by the different resources will now be discussed via flowcharts in FIG. 18. Note that the steps in the flowcharts below can be executed in any suitable order.

Figure 18:
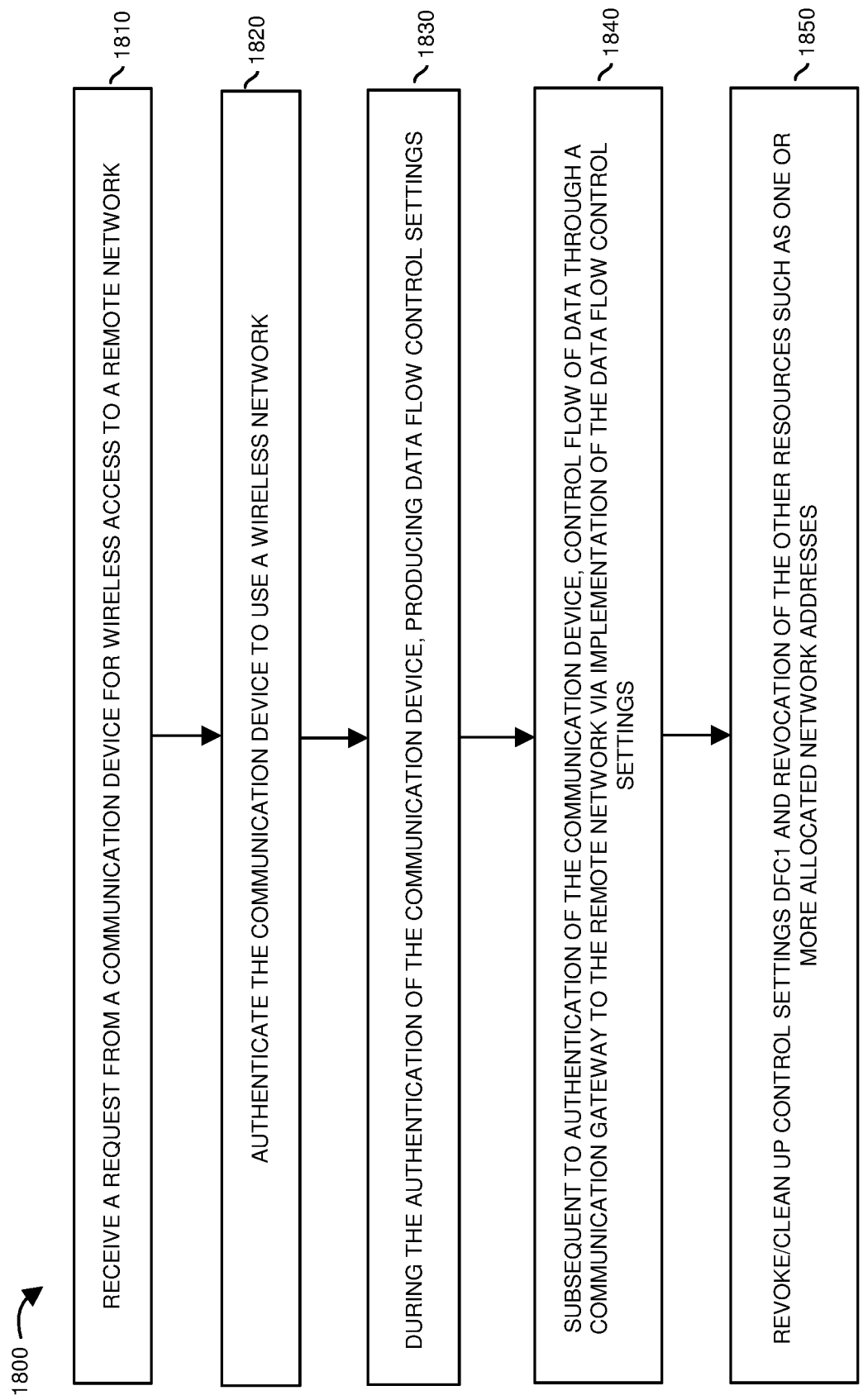
FIG. 18 is an example diagrams illustrating methods according to embodiments herein.

FIG. 18 is a flowchart 1800 illustrating an example method according to embodiments herein. Note that there will be some overlap with respect to concepts as discussed above.

In processing operation 1810, the communication management resource 160 (i.e., any of components associated with the communication management resource 160) receives a request from a communication device 151 for wireless access to a remote network 190 such as through one or more of wireless base station 131, gateway resource 195, backhaul 191, and gateway resource 196.

In processing operation 1820, the communication management resource 160 authenticates the communication device 151 to use the wireless network and corresponding services associated with the wireless base station 131.

In processing operation 1830, during the authentication of the communication device 151, the communication management resource 160 produces data flow control settings DFCS1 and supplies or applies the data flow control settings DFCS1 to one or more of communication gateway resource 195 or communication gateway resource 196.

In processing operation 1840, subsequent to authentication of the communication device 151, the communication management resource 160 controls flow of data (to and from the mobile communication device 151) through communication gateway 195 and communication gateway 196 to the remote network 190 via application and implementation of the data flow control settings DFCS1. As previously discussed, the implementation (setup, application, and/or activation) of data flow control settings DFCS1 to the gateway resources and backhaul prior to the completion of authenticating or notifying the mobile communication device 151 that it has been authenticated provides the mobile communication device 151 better use of the wireless network and corresponding wireless services provided by the wireless access point 131.

In processing operation 1850, as previously discussed, after detecting non-use or termination by the mobile communication device, the communication management resource 160 revokes/cleans up control settings DFC1 and revocation of the other resources such as one or more allocated network addresses (e.g., can we add one more process 1850 in FIG. 18 on how the DFCS revoke/clean up handled from 195 and/or 16*x* using RADIUS accounting/API's).

Note again that techniques herein are well suited to facilitate improved use of bandwidth available in a wireless network. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
receiving a request from a communication device requesting wireless access to a remote network;
in response to receiving the request, authenticating the communication device to use a wireless access point in a wireless network;
prior to completing the authentication of the communication device to use the wireless access point in the wireless network, applying data flow control settings associated with the communication device to a communication gateway, the communication gateway remotely located with respect to the wireless access point, wherein the communication gateway provides coupling between the wireless access point and the remote network; and
subsequent to completing authentication of the communication device to use the wireless access point in the wireless network: i) at the communication gateway, receiving a flow of data from the wireless access point, and ii) controlling conveyance of the flow of data through the communication gateway to the remote network via the applied data flow control settings.

2. The method as in claim 1 further comprising:
during the authentication of the communication device to use the wireless access point, reserving a network address, the network address assigned for use by the communication device; and
subsequent to completing the authentication and applying the data flow control settings to the communication gateway, enabling use of the network address by the communication device to transmit data packets over the wireless network and through the communication gateway to the remote network.

3. The method as in claim 2, wherein the data packets originate from the communication device; and
wherein controlling the flow of data through the communication gateway includes:
at the communication gateway, in response to detecting presence of the network address in each of the data packets, providing a level of service of forwarding the data packets through the communication gateway to the remote network in accordance with the data flow control settings associated with the communication device.

4. The method as in claim 1 further comprising:
prior to completing authentication of the communication device to use the wireless access point:
receiving a unique identifier value assigned to the communication device;
reserving a network address for later use by the communication device; and
deriving the data flow control settings based on the unique identifier value.

5. The method as in claim 4 further comprising:
producing a mapping between the network address and the data flow control settings; and
wherein controlling the flow of data includes implementing the mapping at the communication gateway to control the flow of data in a manner as specified by the data flow control settings.

6. The method as in claim 1, wherein the communication gateway is a first gateway terminal disposed in a respective subscriber domain, the first gateway terminal being in communication with a second gateway terminal.

7. The method as in claim 1 further comprising:
receiving the request at the wireless access point in the wireless network; and
wherein authenticating the communication device includes: authenticating the communication device via conveyance of communications from the wireless access point through the communication gateway to an authentication management resource.

8. The method as in claim 1 further comprising:
monitoring the flow of data between the communication device and the remote network; and
terminating use of the data flow control settings and a network address assigned to the communication device in response to detecting that a magnitude of the flow of data falls below a threshold level for a duration of time, the network address assigned to the communication device prior to completing the authentication.

9. The method as in claim 1 further comprising:
configuring the communication gateway with the data flow control settings prior to providing notification to the communication device of successful authentication of the communication device to use the wireless network.

10. The method as in claim 1 further comprising:
configuring the communication gateway with the data flow control settings prior to providing notification to the communication device that the communication device has been authenticated to use the wireless network by an authentication server.

11. The method as in claim 1 further comprising:
during the authentication:
detecting an identity of the communication device;
determining a quality of service to provide to the communication device based on the detected identity; and
producing the data flow control settings to provide the determined quality of service to the flow of data, the flow of data wirelessly received at the wireless access point and transmitted from the wireless access point to the communication gateway.

12. The method as in claim 11, wherein controlling the flow of data through the communication gateway includes implementing the determined quality of service as specified by the data flow control settings via a communication pathway including the wireless access point in the wireless network, a cable modem, and a cable modem termination system; and
    wherein the wireless access point in the wireless network provides wireless connectivity between the wireless access point and the communication device.
13. The method as in claim 1 further comprising:
    receiving a unique identifier value assigned to the communication device prior to the completing of the authentication of the communication device to use the wireless network; and
    deriving the data flow control settings based on the unique identifier value.
14. The method as in claim 13 further comprising:
    during authentication of the communication device to use the wireless access point in the wireless network, via the wireless access point, communicating with the communication device to retrieve the unique identifier value assigned to the communication device.
15. The method as in claim 1, wherein the flow of data includes data packets originating from the communication device, the data packets transmitted from the communication device over the wireless network and through the wireless access point to the communication gateway.
16. The method as in claim 1 further comprising:
    prior to completing the authentication of the communication device to use wireless services provided by the wireless access point to access the remote network through the communication gateway, assigning a network address to the communication device; and
    producing map information mapping the network address to the data flow control settings.
17. The method as in claim 16, wherein controlling conveyance of the flow of data includes:
    at the communication gateway, implementing the map information to control the flow of data through the communication gateway to the remote network.
18. The method as in claim 17, wherein the flow of data includes data packets originating from the communication device, the data packets transmitted from the communication device over the wireless network to the wireless access point, the wireless access point transmitting the data packets to the communication gateway, each of the data packets including the network address assigned to the communication device;
    wherein implementing the map information includes: at the communication gateway:
        detecting presence of the network address in each of the data packets;
        via the map information, mapping the network address to the data flow control settings; and
        forwarding the data packets to the remote network in accordance with the applied data flow control settings.
19. The method as in claim 18 further comprising:
    during an association of the communication device with the wireless access point prior to completing the authentication of the communication device, receiving a unique identifier value assigned to the communication device; and
    deriving the data flow control settings based on the unique identifier value.
20. The method as in claim 19 further comprising:
    authenticating the communication device via conveyance of communications from the wireless access point through the communication gateway to an authentication management resource.

21. The method as in claim 20 further comprising:
    terminating use of the data flow control settings associated with the communication device in response to detecting that a magnitude of the flow of data through the communication gateway falls below a threshold level for a duration of time.
22. The method as in claim 21 further comprising:
    configuring the communication gateway with the data flow control settings prior to providing notification to the communication device that the communication device has been authenticated to use the wireless network by the authentication management resource.
23. The method as in claim 1, wherein applying the data flow control settings includes:
    configuring the communication gateway with the data flow control settings prior to providing notification to the communication device that the communication device has been authenticated by the authentication management resource to use the wireless access point in the wireless network.
24. A system comprising:
    communication management hardware disposed in a network environment, the communication management hardware operable to:
        receive a request from a communication device for wireless access to a remote network;
        authenticate the communication device to use a wireless network;
        during the authentication of the communication device:
            i) reserve a network address for the communication device, and ii) apply data flow control settings to a communication gateway; and
        subsequent to authentication of the communication device, controlling flow of data through the communication gateway to the remote network via implementation of the data flow control settings.
25. The system as in claim 24, wherein the communication management hardware is further operable to:
    subsequent to the authentication, assign the communication device use of the network address to the communication device.
26. The system as in claim 25, wherein the communication management hardware is further operable to:
    receive data packets originating from the communication device; and
    in response to detecting presence of the network address in each of the data packets, via the communication gateway, provide a level of service of forwarding the data packets through a network to the remote network in accordance with the data flow control settings.
27. The system as in claim 24, wherein the communication management hardware is further operable to:
    during the authentication: i) receive a unique identifier value assigned to the communication device, and ii) reserve a network address for later use by the communication device; and
    derive the data flow control settings based on the unique identifier value.
28. The system as in claim 27, wherein the communication management hardware is further operable to:
    produce a mapping between the network address and the data flow control settings.
29. The system as in claim 24, wherein the communication management hardware is further operable to:
    receive an identity of the communication device during association of the communication device to a network;

determine a quality of service to provide to the communication device based on the received identity; and produce the data flow control settings to provide the determined quality of service.

30. Computer-readable storage hardware having instructions stored thereon, the instructions, when carried out by computer processor hardware, cause the computer processor hardware to:

receive a request from a communication device for wireless access to a remote network;

authenticate the communication device to use a wireless network;

during the authentication of the communication device: i) reserve a network address for the communication device, and ii) apply data flow control settings to a communication gateway; and subsequent to authentication of the communication device, control flow of data through the communication gateway to the remote network via implementation of the data flow control settings.

\* \* \* \* \*